Figure 12:
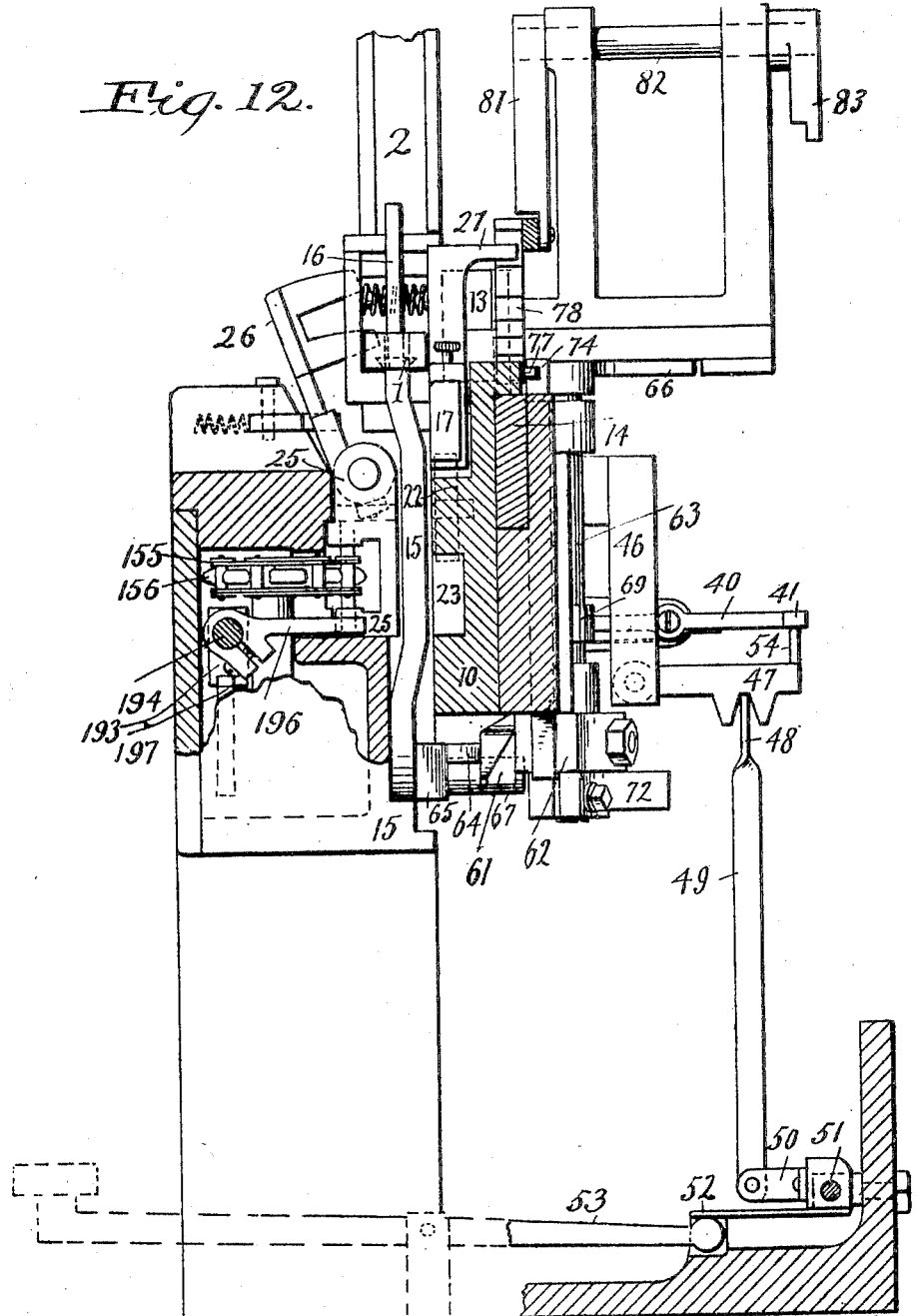

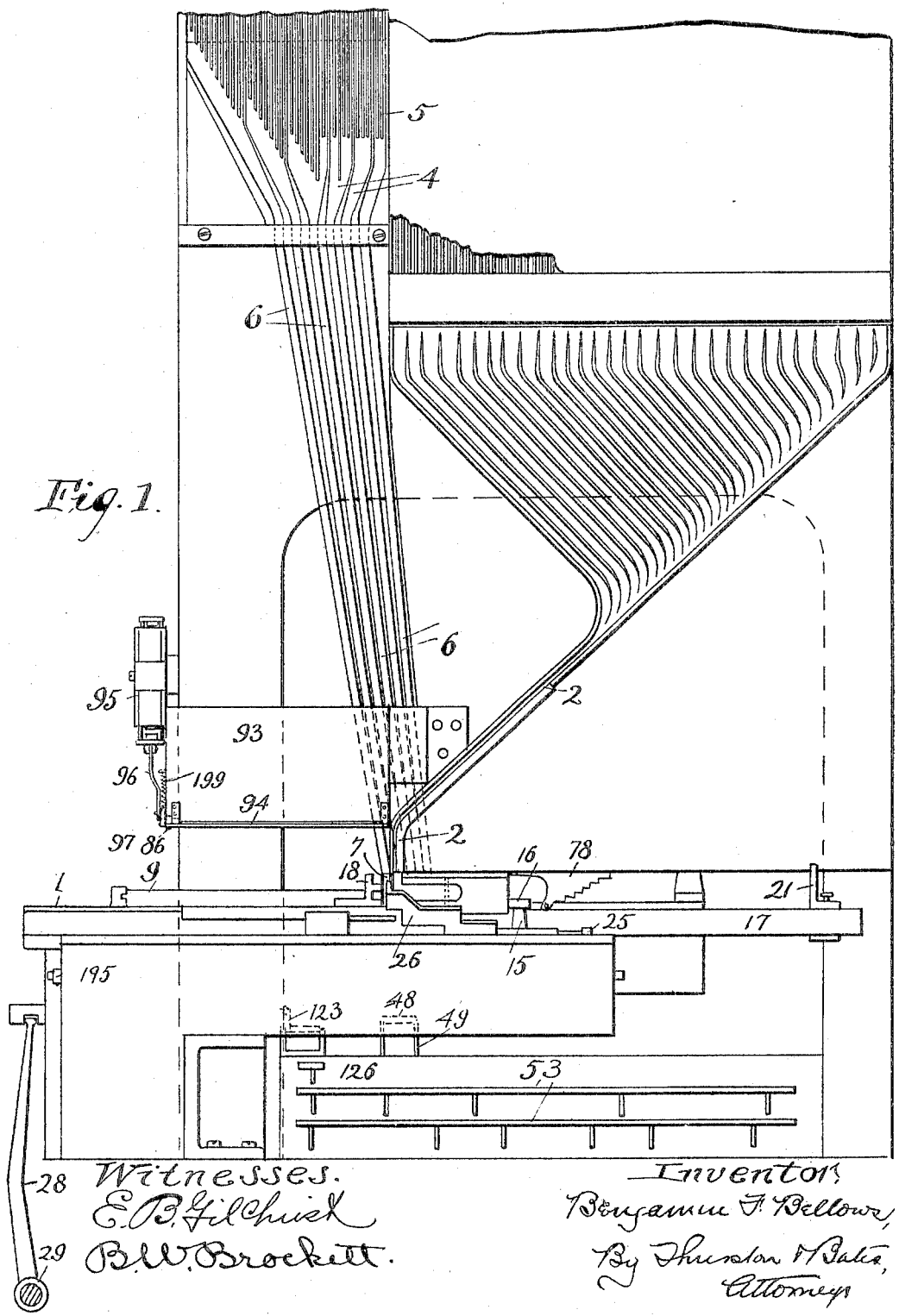

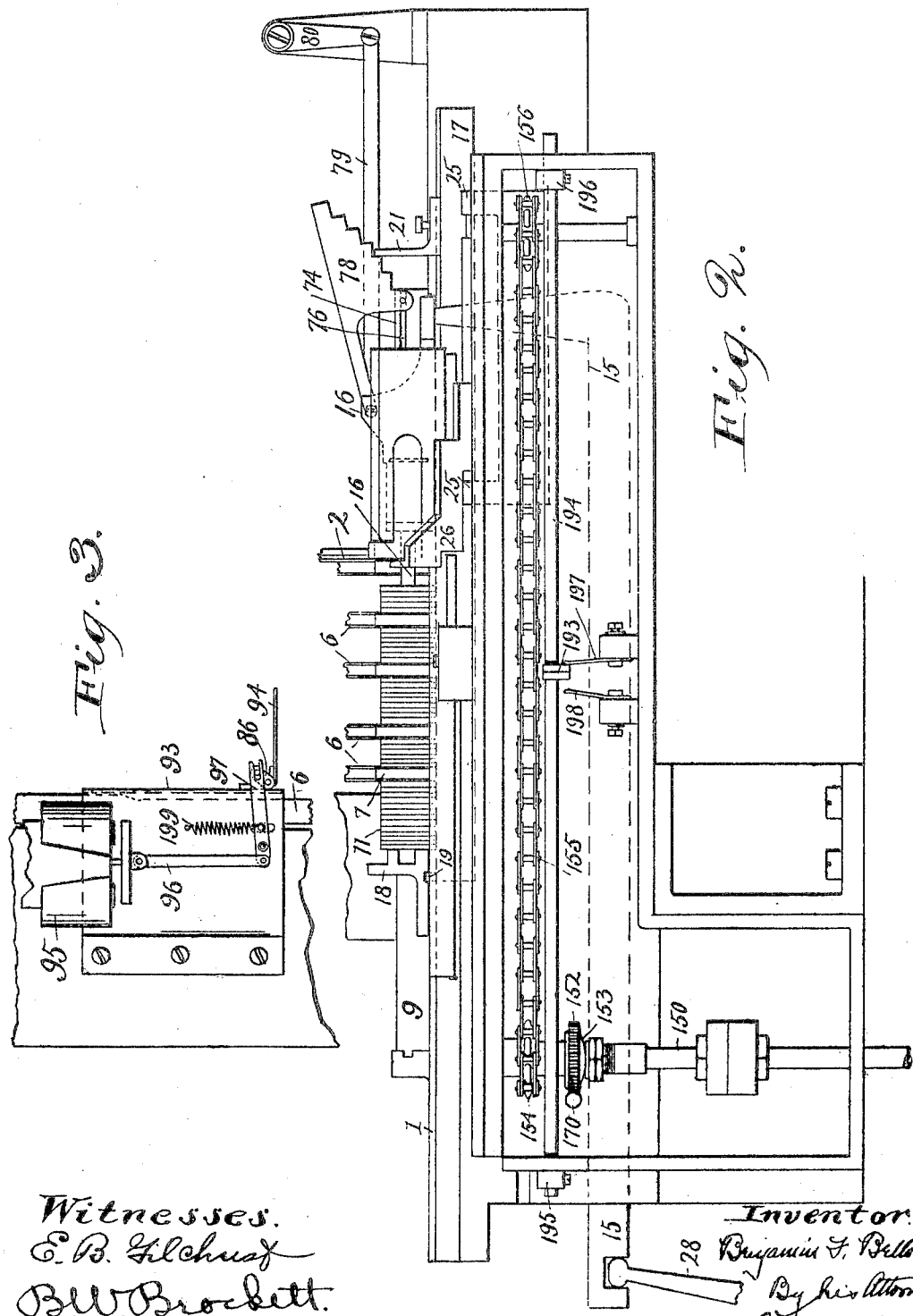

No. 797,549. PATENTED AUG. 22, 1905.
B. F. BELLOWS.
JUSTIFYING MECHANISM.
APPLICATION FILED JULY 11, 1904.
18 SHEETS—SHEET 3.
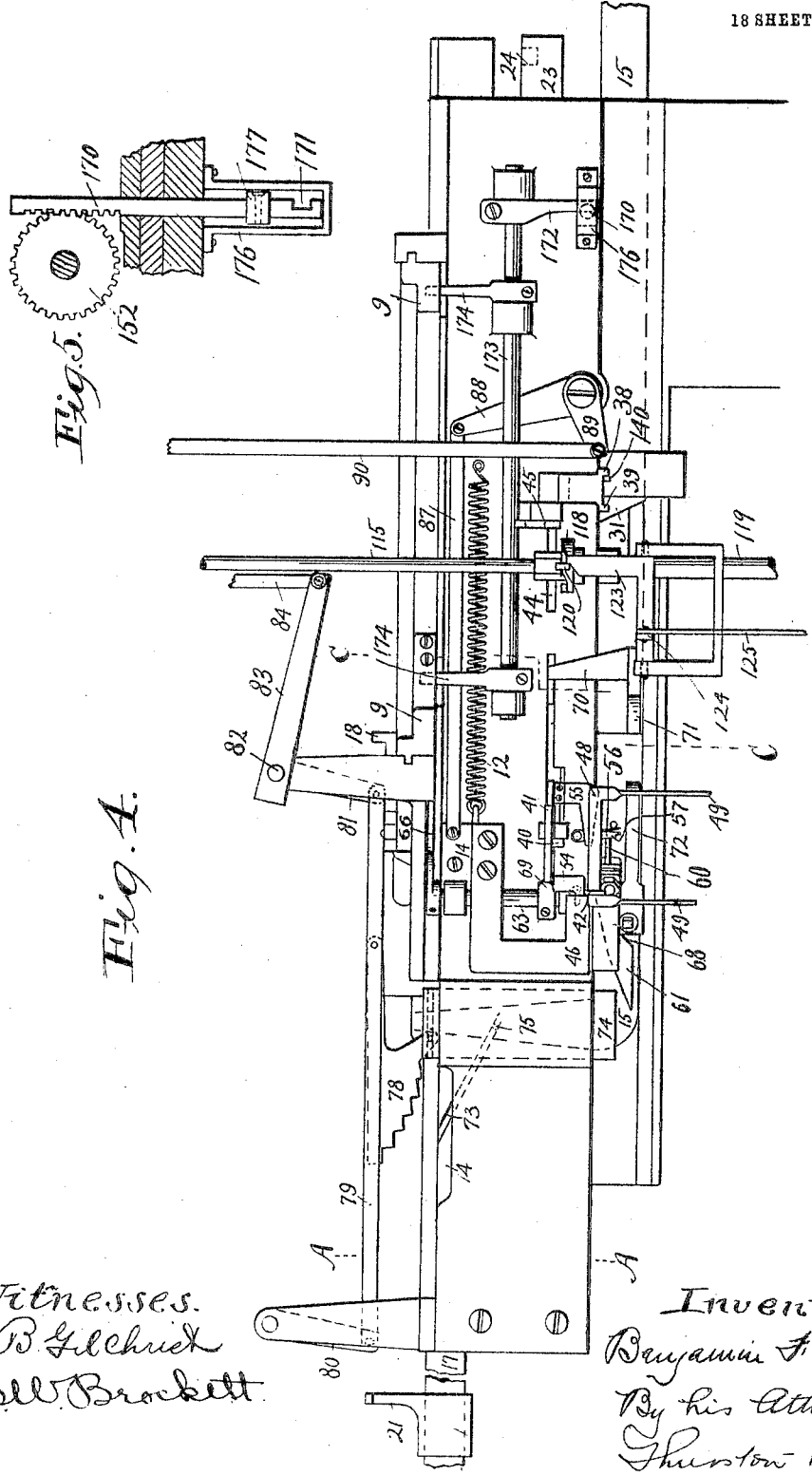
Witnesses.
E. B. Gilchrist
B. W. Brockett
Inventor,
Benjamin F. Bellows
By his Attorneys,
Thurston & Bates.

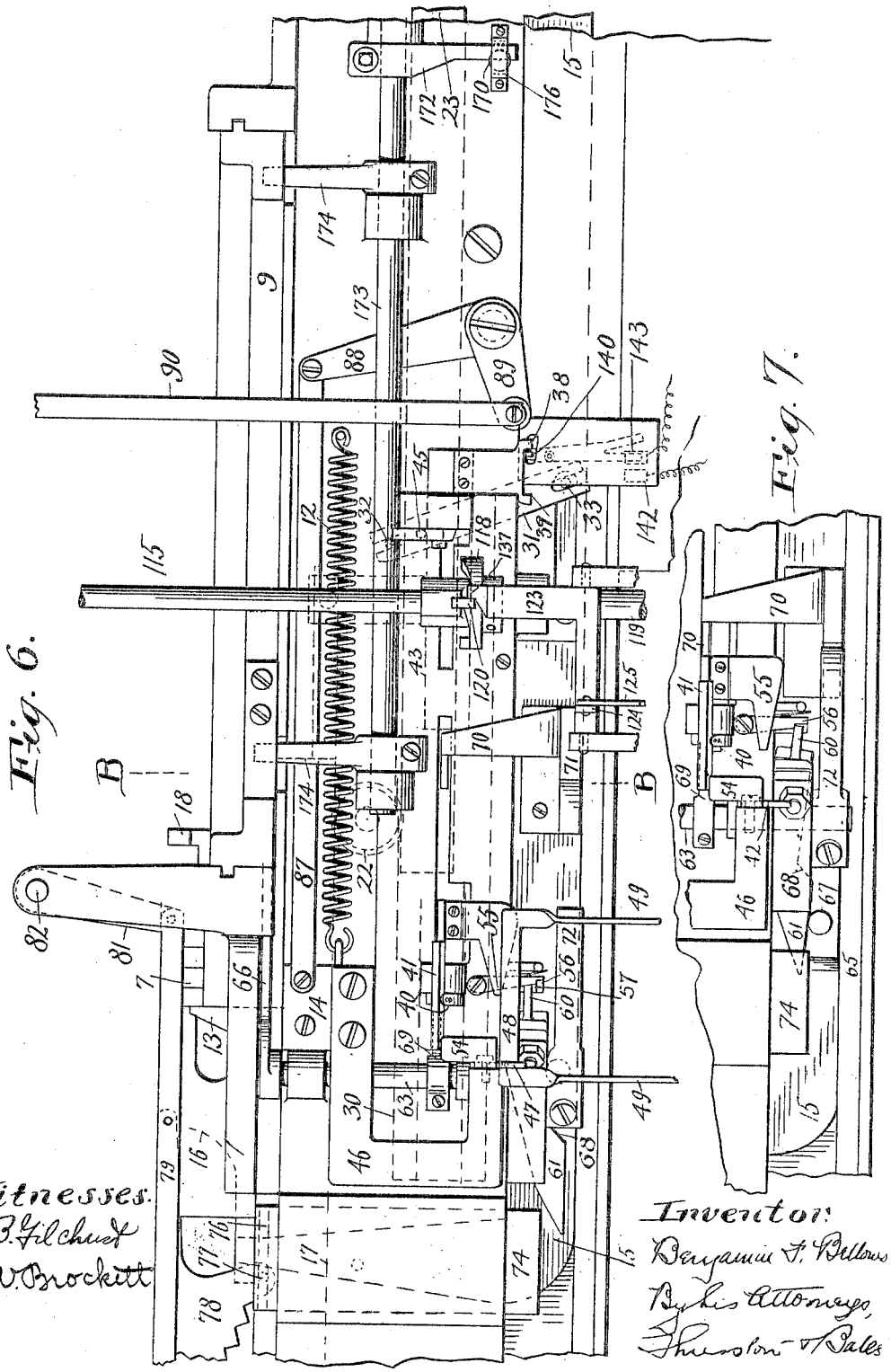

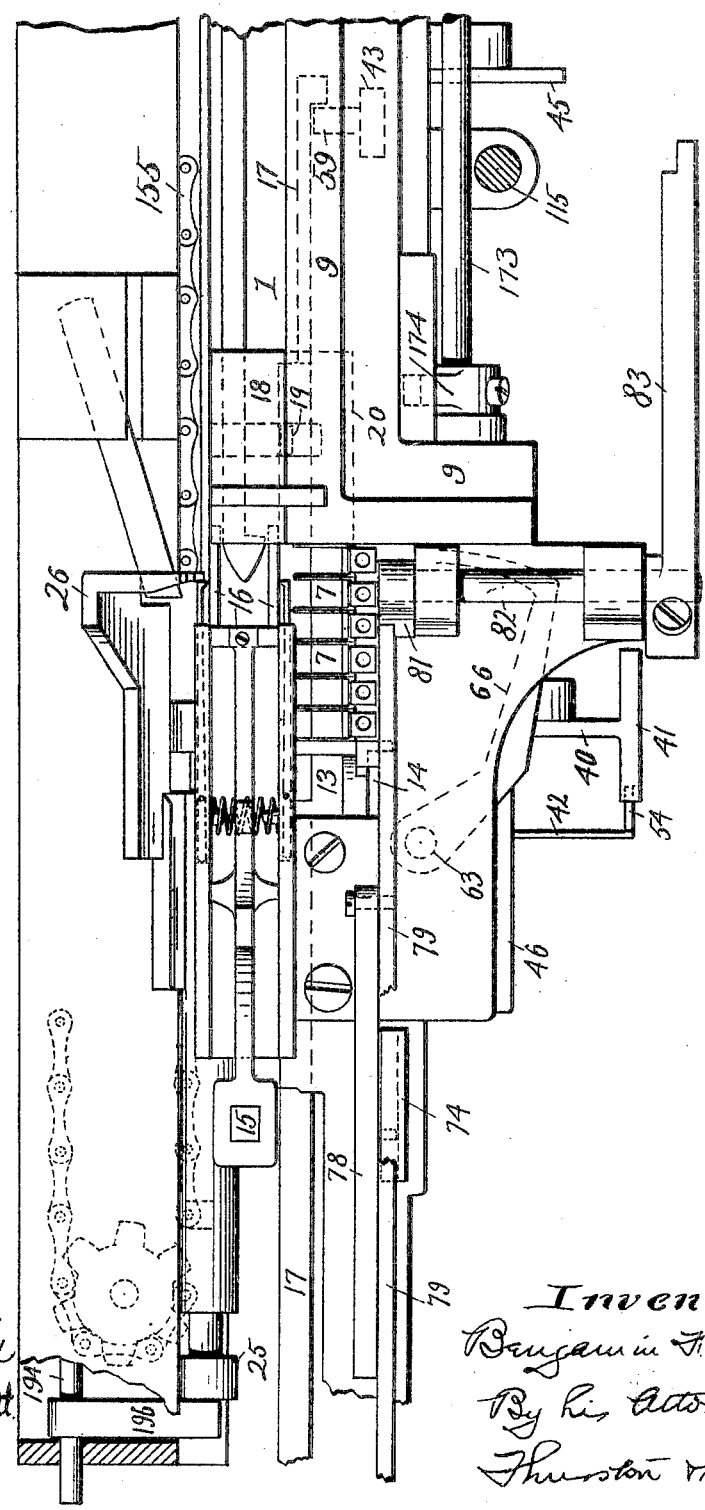

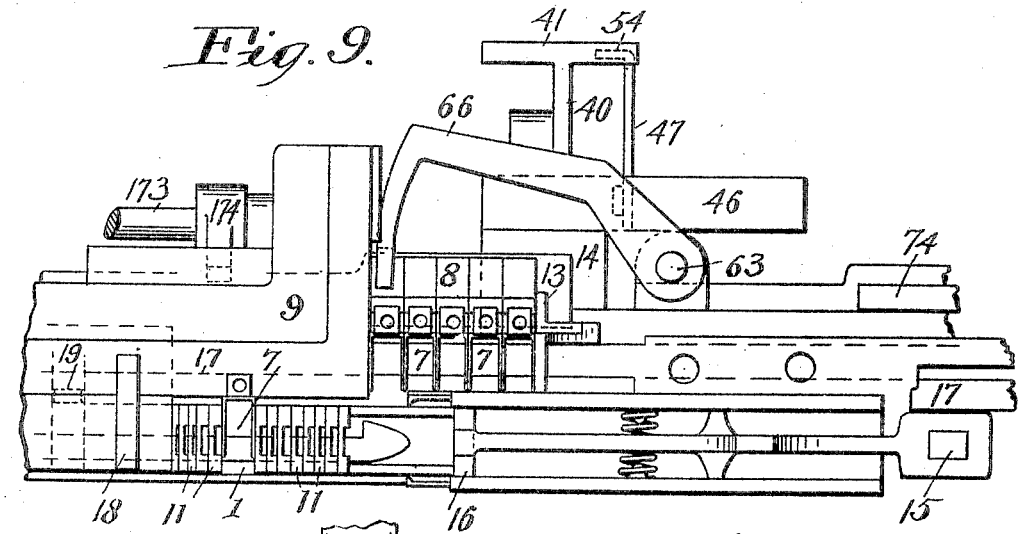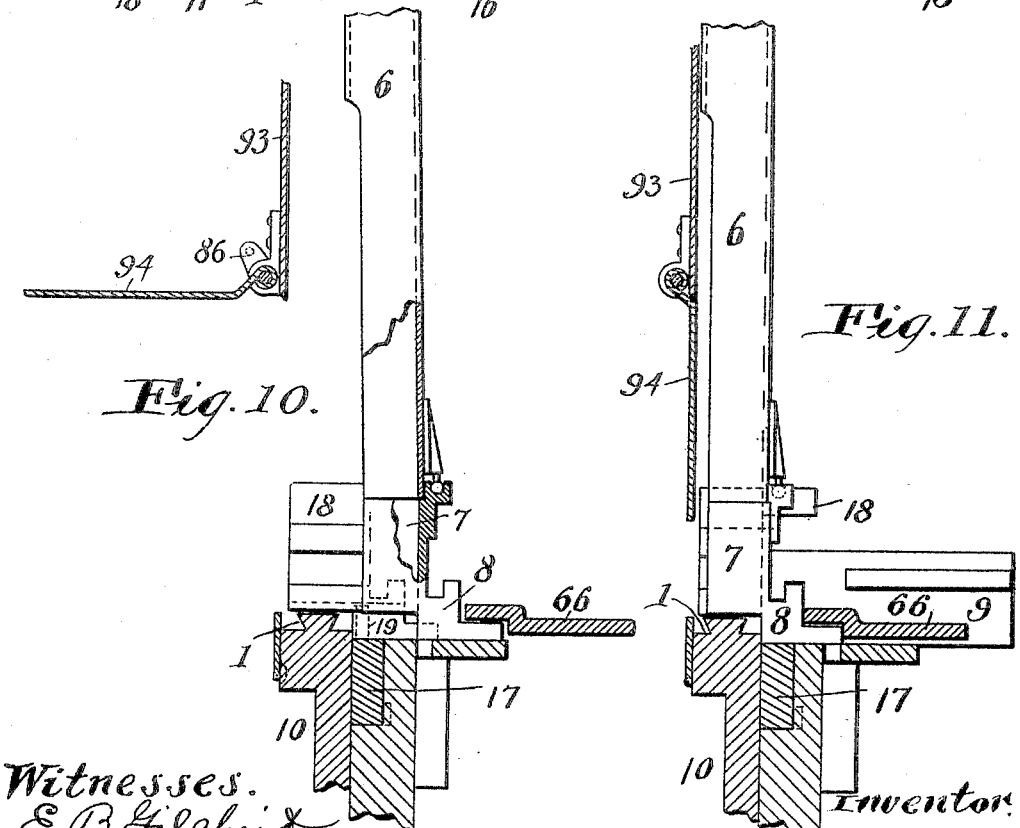

No. 797,549. PATENTED AUG. 22, 1905.
B. F. BELLOWS.
JUSTIFYING MECHANISM.
APPLICATION FILED JULY 11, 1904.

18 SHEETS—SHEET 8.

Witnesses.
E. B. Hilchrist
B. W. Brockett.

Inventor:
Benjamin F. Bellows
By his Attorneys,
Thurston & Bates.

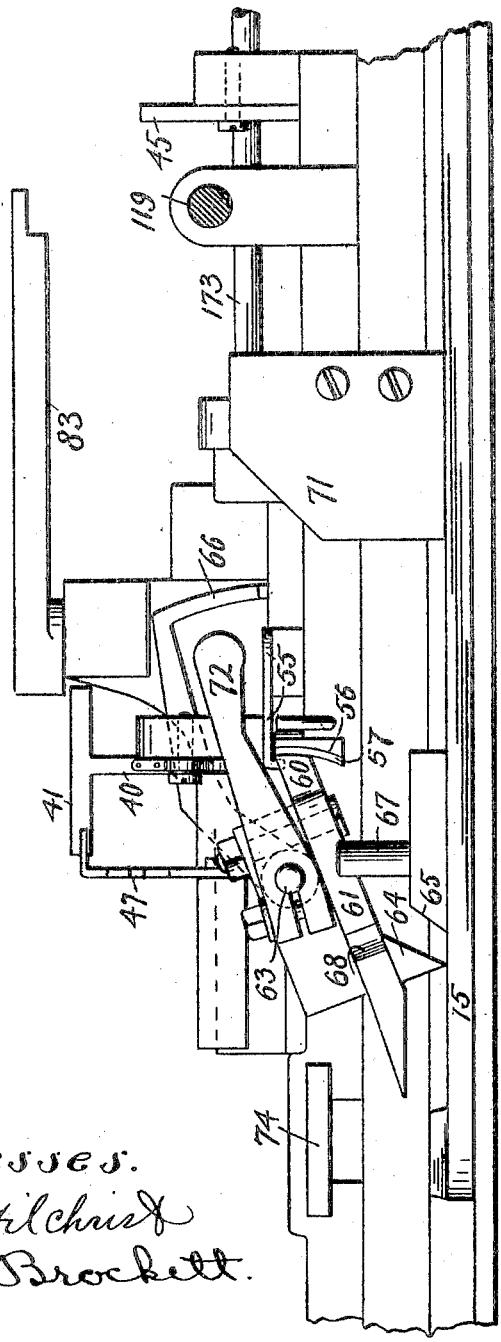

No. 797,549. PATENTED AUG. 22, 1905.
B. F. BELLOWS.
JUSTIFYING MECHANISM.
APPLICATION FILED JULY 11, 1904.
18 SHEETS—SHEET 10.
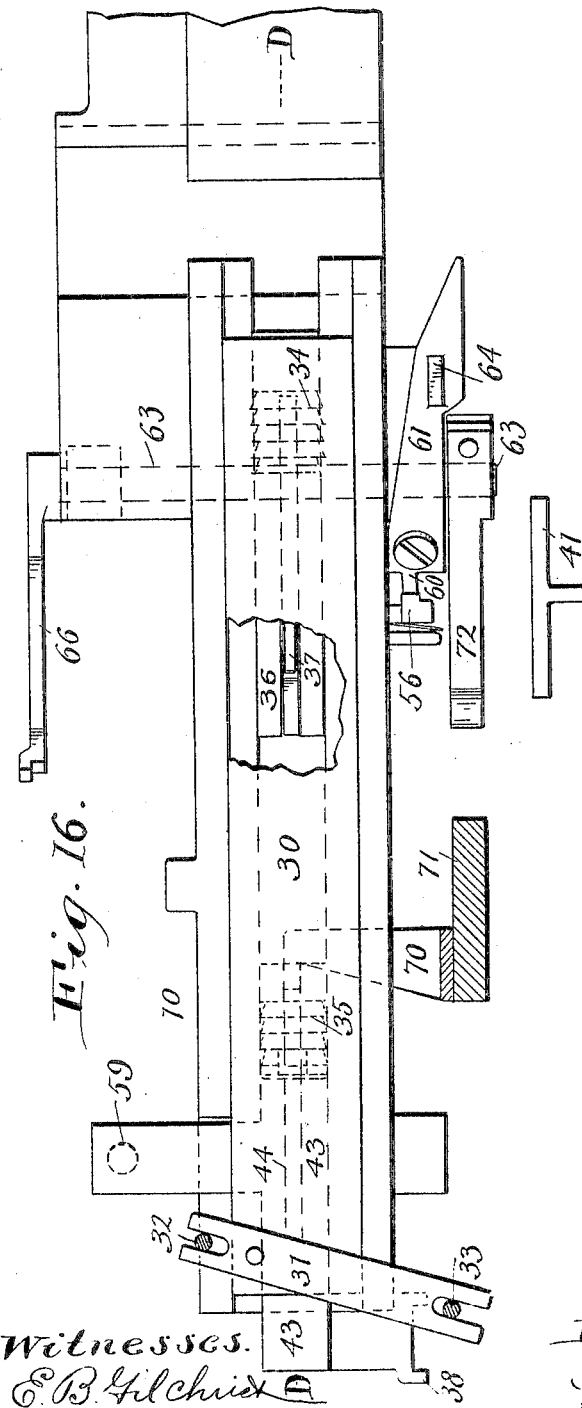
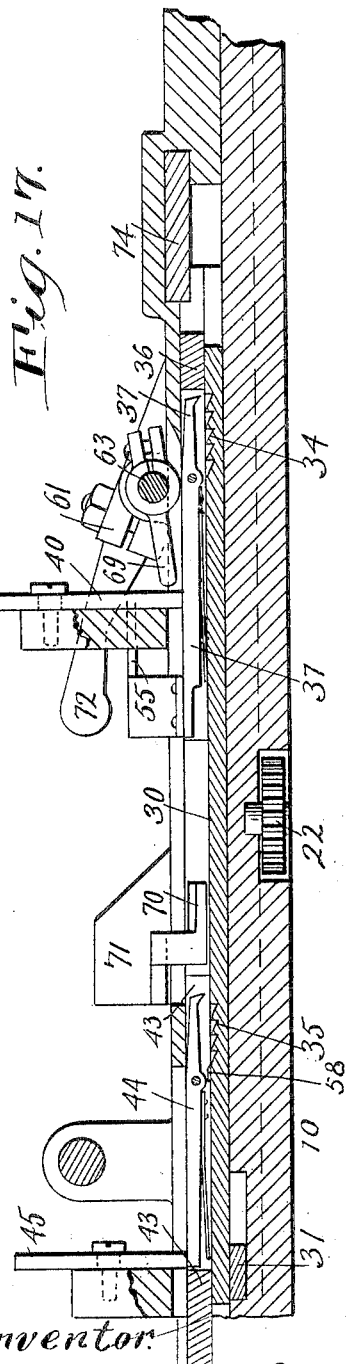
Witnesses.
E. B. Gilchrist
B. W. Brockett
Inventor:
Benjamin F. Bellows,
By Thurston & Bates
Attorneys

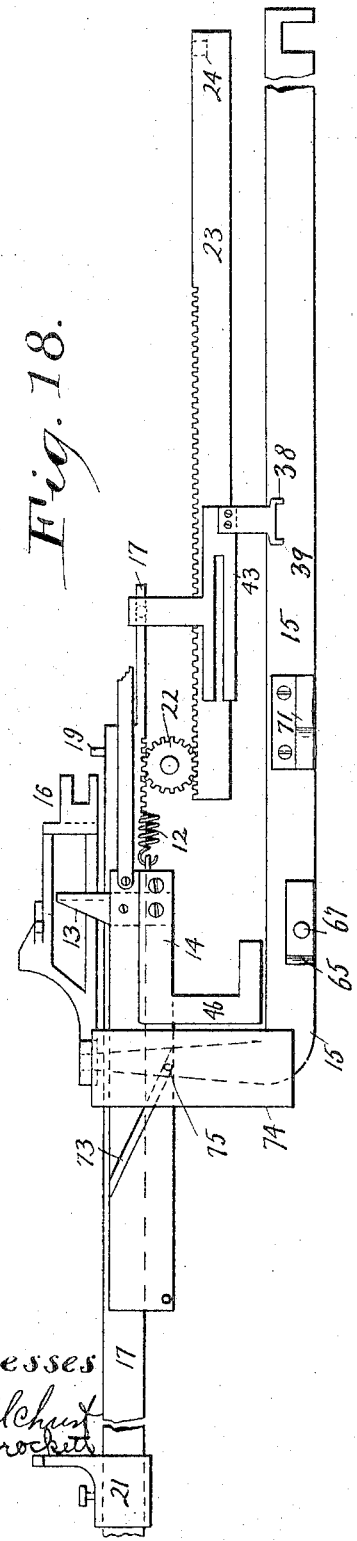

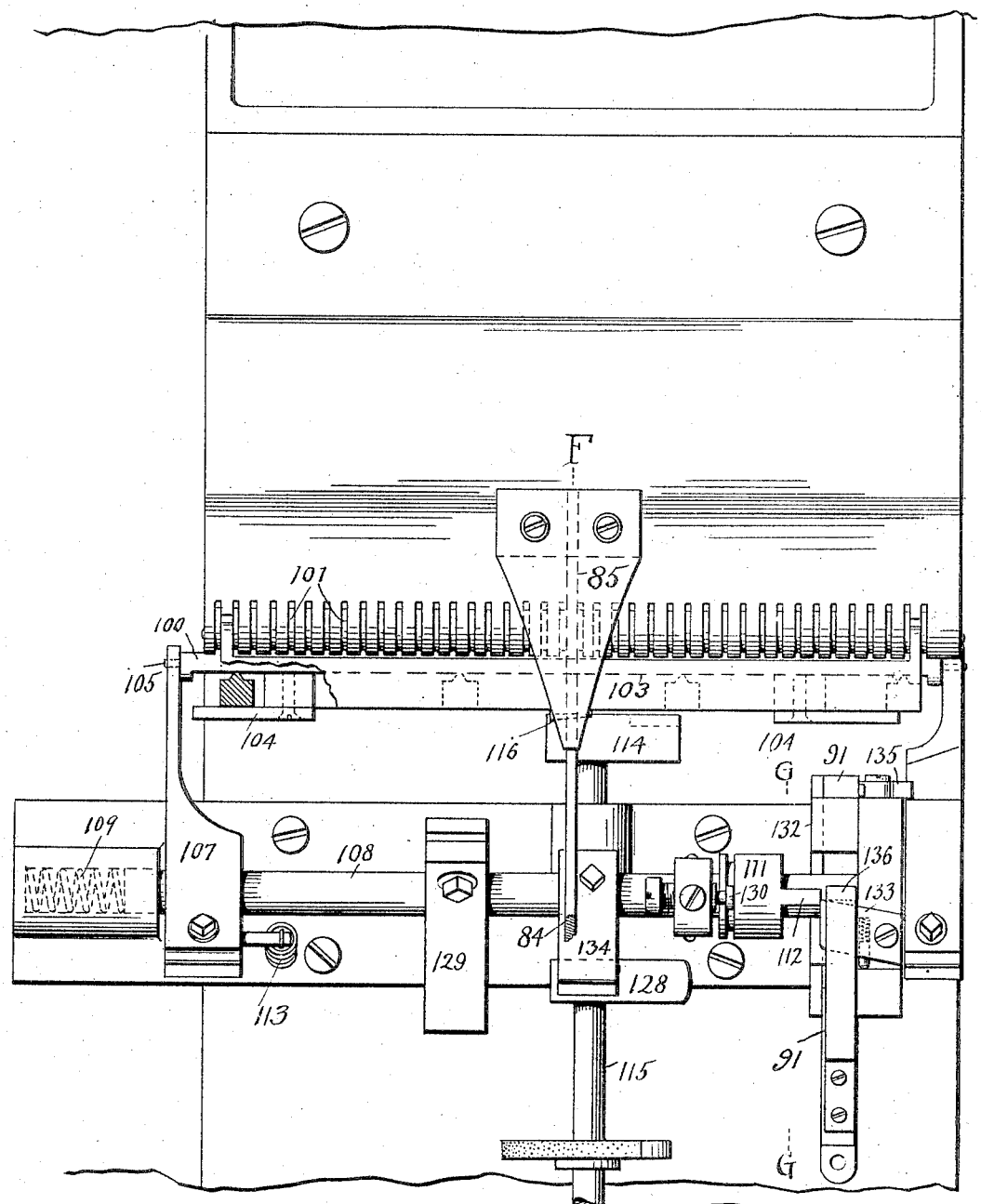

No. 797,549. PATENTED AUG. 22, 1905.
B. F. BELLOWS.
JUSTIFYING MECHANISM.
APPLICATION FILED JULY 11, 1904.
18 SHEETS—SHEET 13.
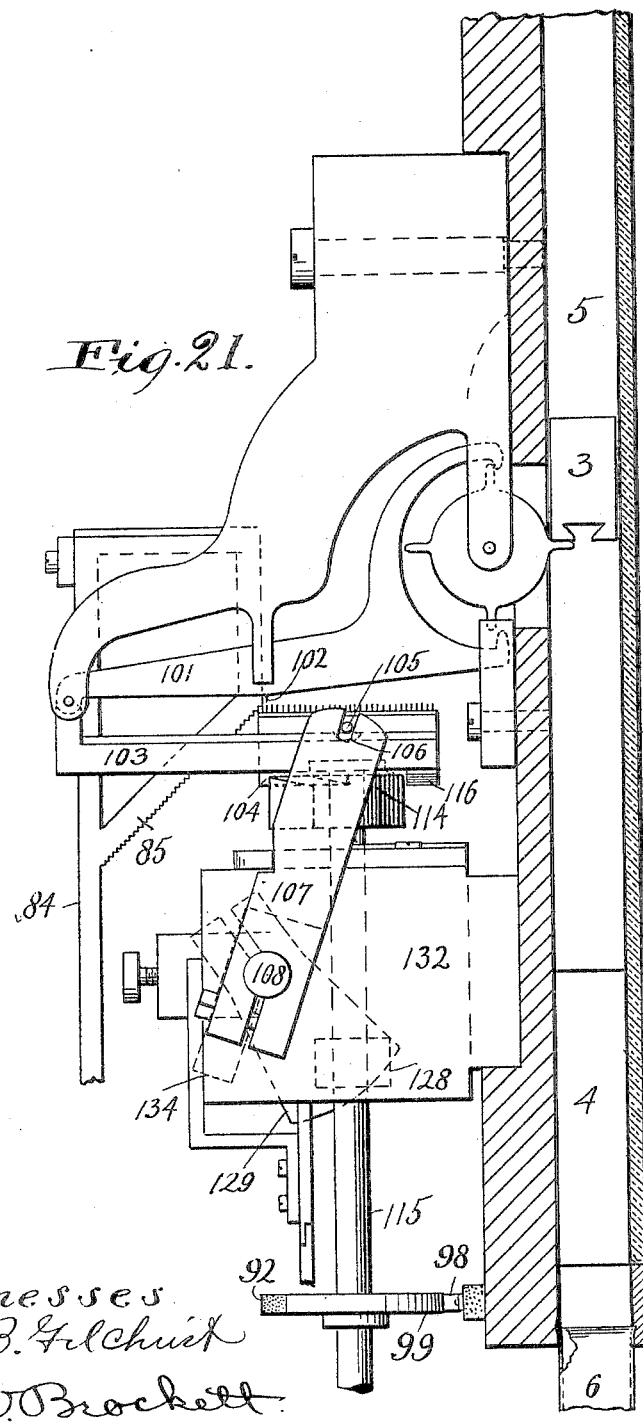

No. 797,549. PATENTED AUG. 22, 1905.
B. F. BELLOWS.
JUSTIFYING MECHANISM.
APPLICATION FILED JULY 11, 1904.

18 SHEETS—SHEET 14.

Witnesses.
E. B. Gilchrist
B. W. Brockett

Inventor.
Benjamin F. Bellows,
By his Attorneys,
Thurston & Bates

No. 797,549. PATENTED AUG. 22, 1905.
B. F. BELLOWS.
JUSTIFYING MECHANISM.
APPLICATION FILED JULY 11, 1904.
18 SHEETS—SHEET 15.
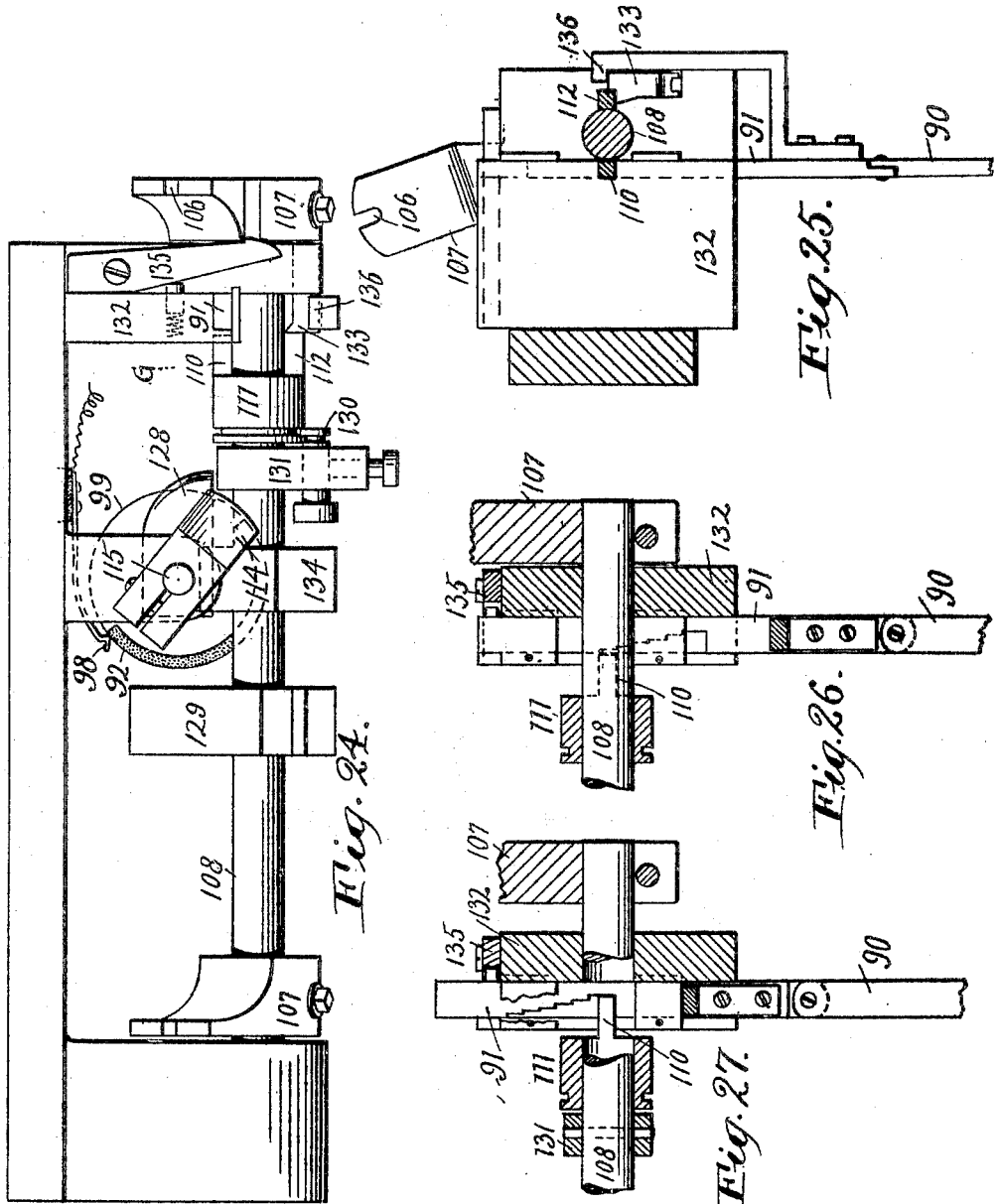
Witnesses.
E. B. Gilchrist
B. W. Brockett
Inventor
Benjamin F. Bellows
By his Attorneys
Thurston & Bates

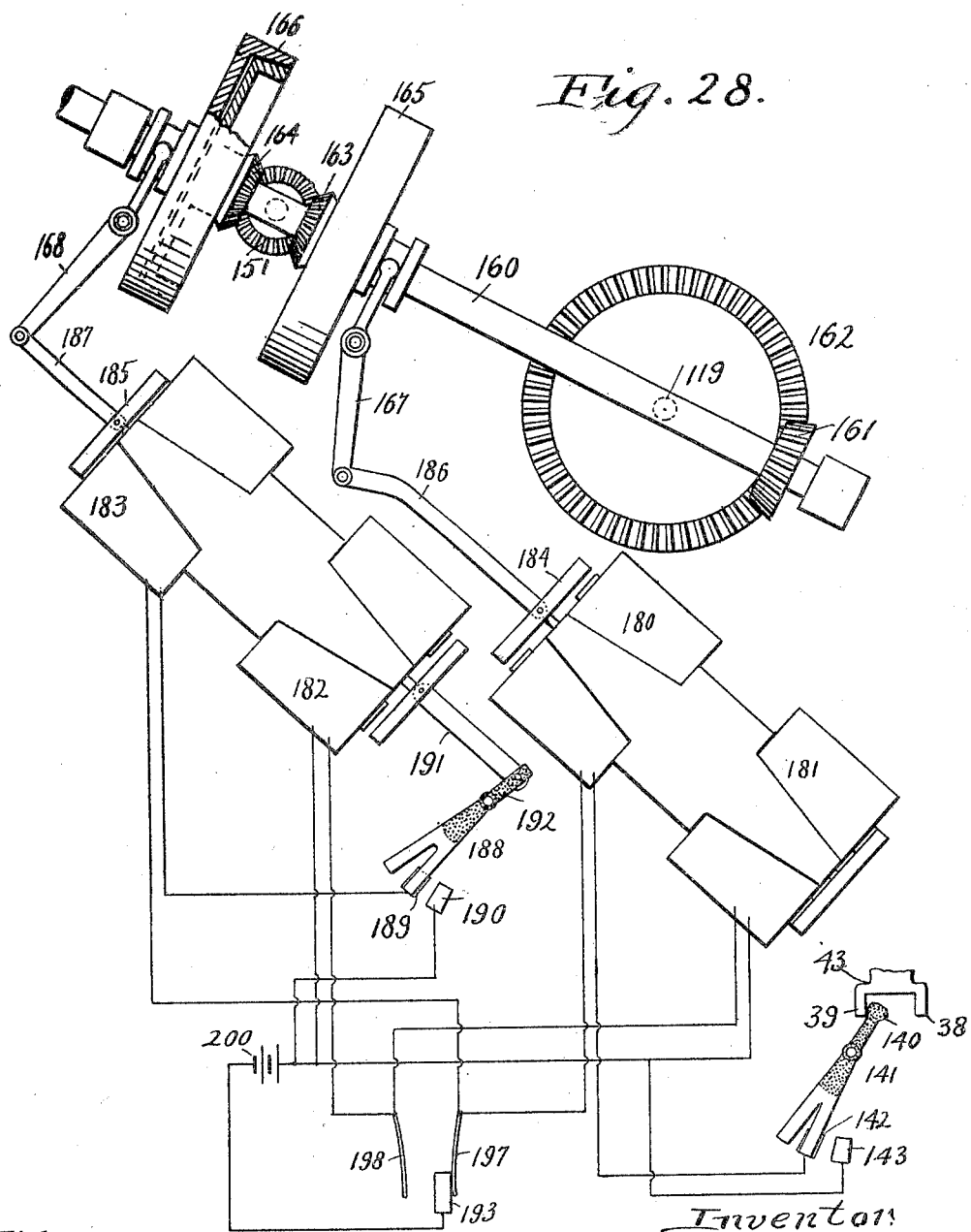

No. 797,549. PATENTED AUG. 22, 1905.
B. F. BELLOWS.
JUSTIFYING MECHANISM.
APPLICATION FILED JULY 11, 1904.

18 SHEETS—SHEET 17.

Witnesses.
E. B. Gilchrist
B. W. Brockett

Inventor
Benjamin F. Bellows
By his attorney
Thurston & Bates

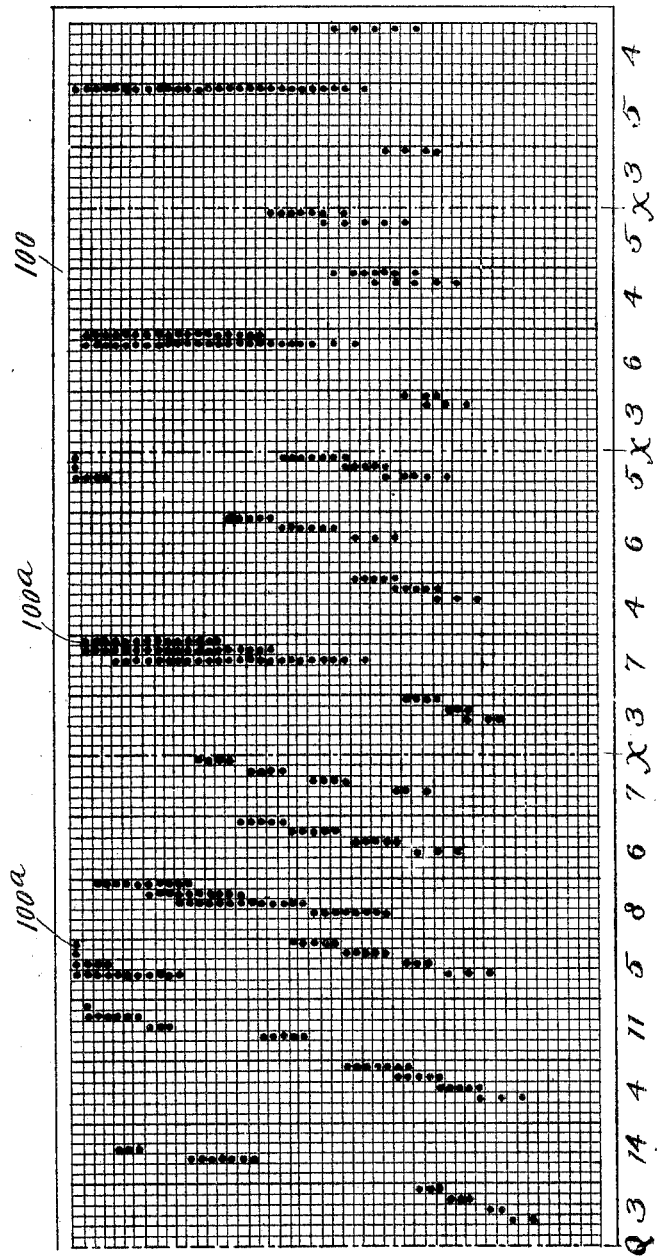

UNITED STATES PATENT OFFICE.

BENJAMIN F. BELLOWS, OF CLEVELAND, OHIO, ASSIGNOR, BY MESNE ASSIGNMENTS, TO ELECTRIC COMPOSITOR COMPANY, OF JERSEY CITY, NEW JERSEY, A CORPORATION OF NEW JERSEY.

JUSTIFYING MECHANISM.

No. 797,549.     Specification of Letters Patent.     Patented Aug. 22, 1905.

Application filed July 11, 1904. Serial No. 216,042.

*To all whom it may concern:*

Be it known that I, BENJAMIN F. BELLOWS, a citizen of the United States, residing at Cleveland, in the county of Cuyahoga and State of Ohio, have invented a certain new and useful Improvement in Justifying Mechanism, of which the following is a full, clear, and exact description, reference being had to the accompanying drawings.

This invention is intended for use in connection with a machine which assembles lines of matrices or type for the purpose of justifying said lines. It resembles the invention disclosed in my prior patent, No. 727,267, in that the spacers are released from their several magazines by the upward movement of a selecting-plate carrying a plurality of escapement-operating pins, which plate is moved as a line is assembled in two horizontal directions to bring pins thereon beneath the proper escapement, and that the said spacers when released are conveyed by tubes and delivered into the line, thereby justifying it.

The primary objects of the improvement are to produce properly coördinated and synchronized movements of the said selecting-plate and the spacer-assembling tubes without relying upon electromagnets to furnish the motive power.

The present invention relates to the mechanism for inserting the tubes into the line and for simultaneously causing a proper movement of the selecting-plate in one direction, to the mechanism through which each increase in the length of the line causes a proportionate movement of said selecting-plate in another direction provided the line has reached justifiable length and the increase in length is due to the addition of matrices, but causes no such movement if the increase in length is due to the addition of a spacer-tube, to the means for moving this plate in the spacer-releasing direction, to the means for properly timing the action of various parts of the machine, and to the mechanism whereby all of the parts concerned in justifying a line are returned to their initial positions when they have performed their functions, all of which is shown in the drawings and hereinafter described and definitely set forth in the claims.

Figure 13:
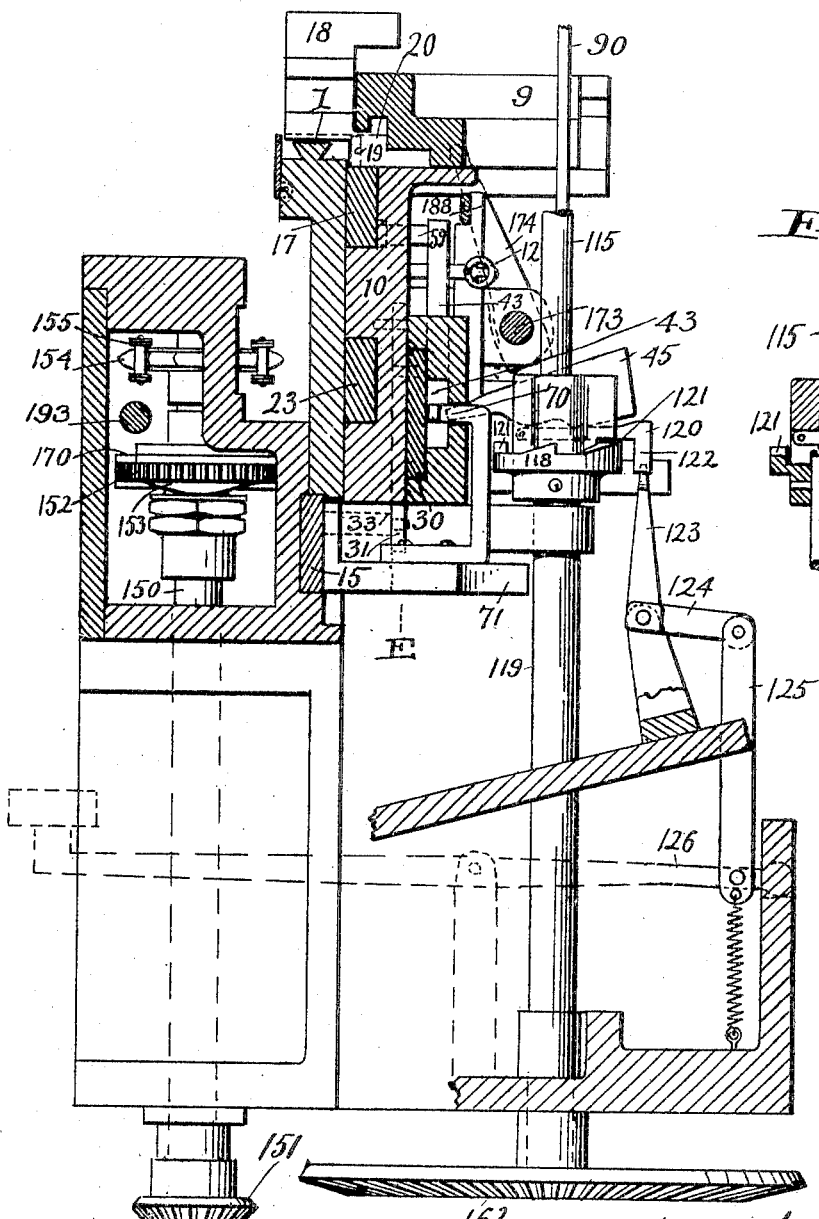
Figure 14:
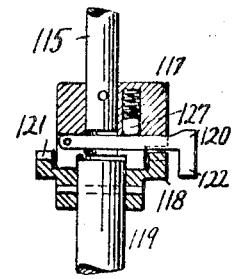
Figure 22:
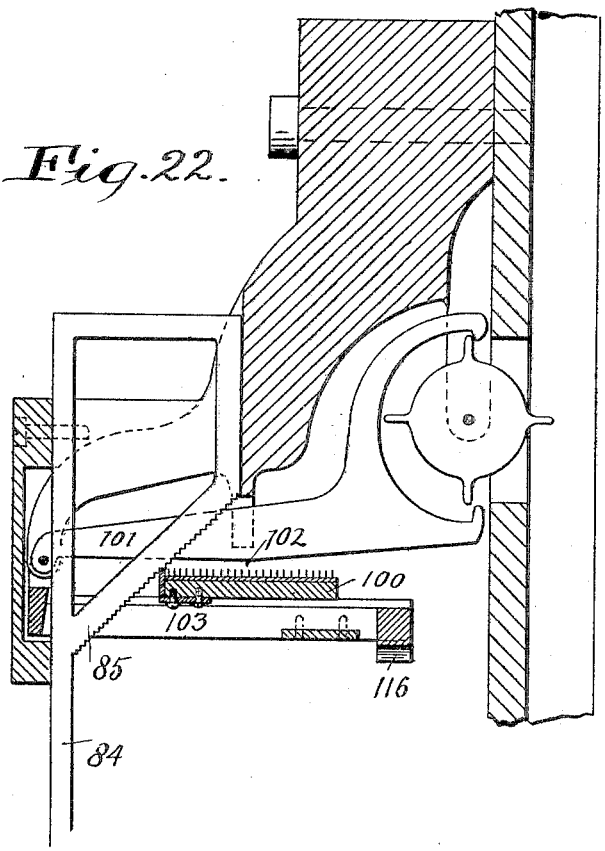
Figure 23:
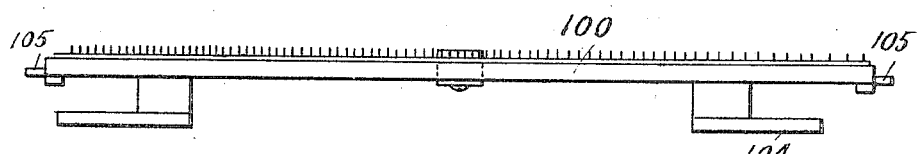
Figure 29:
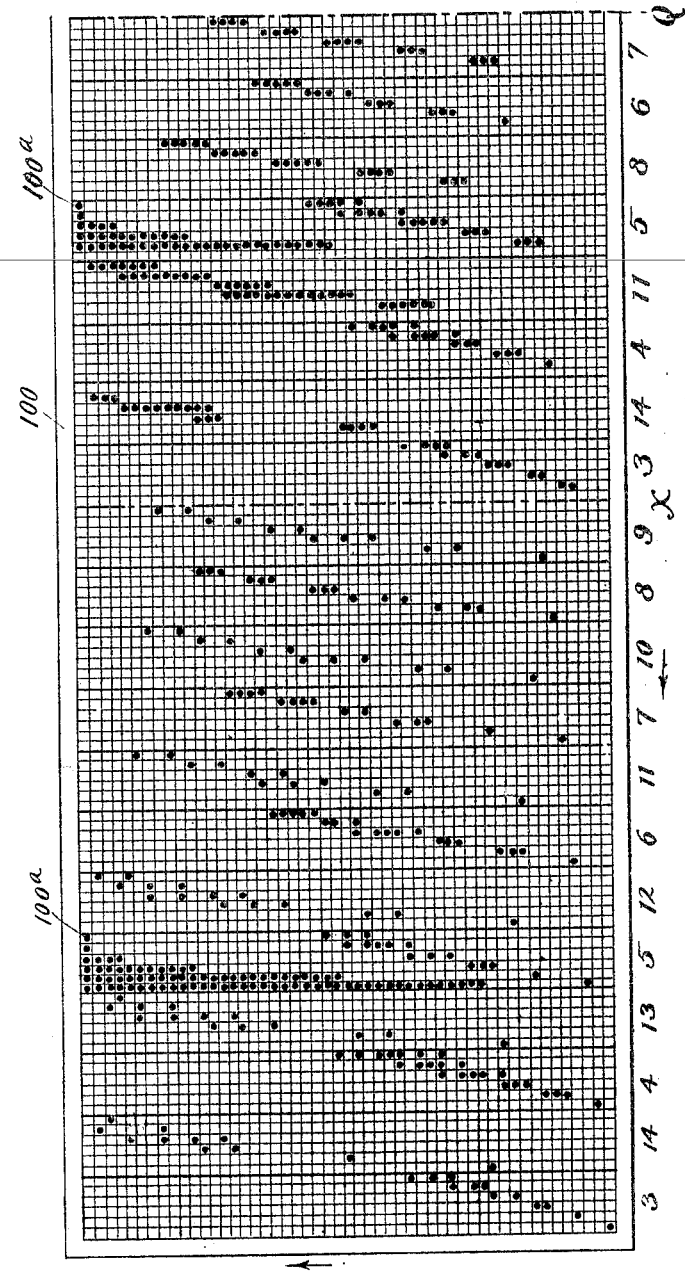

In the drawings, Figure 1 is a front elevation of the mechanism constituting the present invention and so much of the matrix-assembling machine with which it is associated as is required to show their operative relation. Fig. 2 is an enlarged front elevation of the mechanism adjacent to the assembling-rail. Fig. 3 is a left-side elevation of the plate 93, gate 94, and the operating mechanism of said gate. Fig. 4 is a rear elevation of the mechanism adjacent to the assembling-rail. Fig. 5 is a plan view of the rack-slide 170 and some associated parts, the supporting-frame member being sectioned. Fig. 6 is a full size rear elevation of a portion of the mechanism shown in Fig. 4, the parts being shown in the positions they occupy after lever 61 has fallen down, but before the slide 15 has engaged with it. Fig. 7 is a rear elevation of some of the parts shown in Fig. 6, showing the parts in their normal positions, to which they are returned just after a tube has been moved forward. Fig. 8 is a top plan view of certain parts of the mechanism viewed from the rear of the machine. Fig. 9 is a top plan view, from the front of the machine, of the assembling-rail and some of the mechanism behind it, but near the assembling-point. Fig. 10 is a side elevation, partly sectioned, of the lower end of one of the spacer-assembling tubes when withdrawn behind the assembling-rail and a sectional view of some associated adjacent parts. Fig. 11 is a similar view of the same mechanism when the spacer-assembling tube has been moved forward over the assembling-rail. Fig. 12 is a sectional right end view in the plane indicated by line A A of Fig. 4. Fig. 13 is a sectional right end view in the plane indicated by line C C of Fig. 4. Fig. 14 is an elevation, partly in section, of the clutch mechanism which is shown in Fig. 13. Fig. 15 is a bottom plan of certain parts of the mechanism, particularly the parts having to do with the insertion of the tubes into the line. Fig. 16 is a front view of that part of the built-up frame member 10 and the parts supported thereby which lie behind the line E of Fig. 13. Fig. 17 is a sectional plan of the mechanism shown in Fig. 16 in the plane indicated by line D D. Fig. 18 is a rear view of certain slides when detached from their supports. Fig. 19 is a front view of the same mechanism. Fig. 20 is a rear view of the mechanism immediately concerned in the operation of the spacer-releasing escapements. Fig. 21 is a side elevation of the mechanism shown in Fig. 20, the supporting-frame member being in section. Fig. 22 is a sectional side elevation of mechanism shown in Fig. 21, which shows the position the mechanism occupies before one begins the assembling of the matrix-line. Fig. 22 is a sectional side elevation in the plane of line F of Fig. 20, showing the position of said mechanism when it is about to release the spacers necessary to justify the assembled line. Fig. 23 is a detached rear view of the selecting-plate. Fig. 24 is a plan view of the shaft 108 and certain associated mechanism. Fig. 25 is a sectional inside elevation of the mechanism shown in Fig. 20 and in the plane indicated by line G of said figure. Fig. 26 is a sectional rear view of the mechanism shown in Fig. 25. Figs. 20, 21, 24, 25, and 26 show the position the mechanism occupies just after the shaft 115 has completed its revolution, but before the wedge 91 has been drawn down to release shaft 108 from the restraining influence of pawls 133 and 135. Fig. 27 is a view similar to Fig. 26; but the parts are shown in the position they occupy when wedge 91 has been moved down as far as possible. Fig. 28 is a bottom plan view of the driving-shaft, the clutch mechanism associated therewith, and the shafts driven by said driving-shaft, the lower part of this figure being a diagrammatic view of the circuits of the clutch-operating magnets. Fig. 29 is an enlarged plan view of one part of the selecting-plate 100, and Fig. 29$^a$ is a plan view of the other part of said plate. The two views joined at the dotted lines Q represent the entire plate.

In assembling the matrix or type lines to be justified the matrices 11 (or type) are released one by one from their magazines and are delivered onto the assembling shelf or rail 1 through an assembling-spout 2.

The spacers 3 are stored in magazines 4, each of which has a plurality of channels 5 for containing spacers of different thicknesses. Each spacer-channel has an independent escapement of some approved form, which must include an operating device, as a lever 101. The spacers released by the operation of said escapements fall onto the assembling-rail through tubes 6 and supplemental tubes 7, which are connected with the lower ends of the tubes 6 by flexible devices—as, for example, ball-and-socket connections. (See Fig. 10.) In the specific construction shown the sockets 7$^a$ are secured to the rear sides of the supplemental tubes 7, and the balls are formed on the lower ends of downwardly-extended fingers fixed to the rear sides of the tubes 6, near the lower ends of the latter. This permits the members 7, one of whose functions is to serve as temporary spaces in the matrix-line, to maintain upright positions whether they are in said line or behind it or whether they have been moved to any permissible extent along with the line. These supplemental tubes may be moved forward over the assembling-rail so as to be in the line of assembling matrices, and they may also be moved along with said line of matrices until the line is completed. The upper ends of the tubes 6 are suitably supported so as to permit them to move in the two directions specified. They may, for example, have outwardly-flaring upper ends, which loosely fit in the lower ends of the magazines 4. (See Fig. 21.) The supplemental tubes 7, which have open front sides, may be drawn back out of the line after the spacers have fallen down through tubes 6 and 7 and the spacers will be left in the line between matrices. The supplemental tubes have rearwardly-extended feet 8, which rest upon the fixed frame member 10 and extend beneath the overhanging front edge of a slide 9, which is capable of being moved backward and forward, the upper surface of said feet and the lower surface of the overhanging part of said slide being provided with transversely-extended tongues and grooves which are adapted to interlock, whereby the supplemental tubes may move independently of said slide in a path parallel with the assembling-rail, being guided in that movement by said tongues and grooves, but must accompany the slide in its rearward movement, whereby the tubes are drawn back of the line, so that they do not thereafter interfere with the movement of the matrices along rail 1.

In the particulars briefly referred to above the mechanism shown in the drawings is generically like that which is shown in my said prior patent; but it is here briefly mentioned in order that one may more readily and easily understand the present invention, which will now be described.

Besides the slide 9, which is movable forward and backward, and a slide 74, which is movable vertically and to which specific reference will be presently made, there are eight other slides, which are movable in paths parallel with the assembling-rail in suitable guideways adjacent to said rail in the frame member 10, which for convenience is built of a number of separable but rigidly-connected parts, as shown. Normally the supplemental tubes 7 are behind the assembling-rail and are closely packed between the right-hand end of the slide 9 and an upward-extended finger 13 on the tube-packing slide 14. This slide is always under the influence of a spring 12, tending to draw it to the left, whereby said finger will press the tubes together toward the slide 9. The line-packing slide 15 is extended upward at its right end, and the packing-arm 16 is secured to this upward extension, which packing-arm overhangs the assembling-rail, and its left end is moved back and forth past the points at which the tubes are severally moved forward into the line and the matrices are delivered onto the assembling-rail. This line-packer slide is being constantly reciprocated by the action of, for example, the lever 28, attached to the rock-shaft 29. It will be understood, of course, that the particular mechanism for imparting to this slide 15 the continuous reciprocating motion is not essential to the invention. Another one of these transversely-movable slides is the detent-slide 17, from which a finger 19 projects upwardly into a rearwardly-extended slot in the lower surface of the detent 18. (See Figs. 8 and 17.) This detent has a rearwardly-extended foot 20, which extends beneath the overhanging front edge of the slide 9 and has a tongue-and-groove connection therewith, so that said detent may be moved to the right and left with the detent-slide and may also be moved backward and forward by the slide 9. When the slide 9 is in its forward position, the detent overhangs the assembling-rail. When the slide 9 is moved backward for the primary purpose for drawing the tubes from the line, it also draws this detent out of the line, so that it does not interfere with the movement to the left along the assembling-rail of the assembled and justified matrix-line. A finger 21, whose function will be presently explained, is adjustably attached to and extends upwardly from said detent-slide near the right-hand end thereof. Rack-teeth are formed in the lower edge of the detent-slide, and these rack-teeth engage with an idler-pinion 22, which also engages with rack-teeth on the detent-return slide 23. This detent-return slide has a forwardly-projecting finger 24, which lies in the path of a push-slide 25. The primary function of this push-slide is to push the assembled and justified line along the assembling-rail out of the way, so that another line may be assembled and justified, but it is utilized to perform some very important functions in connection with the mechanism which is concerned in the justification of the lines. For example, as it moves to the left to push a justified line along the assembling-rail it engages with the finger 24, and so moves the detent-return slide to the left, and this results in the movement of the detent-slide to the right back to its initial position, which is shown in Fig. 6.

An intermediate slide 30 is operatively connected with the line-packing slide 15, so that it reciprocates constantly, but through a shorter path than that of the line-packing slide. The operative connection shown consists of a rocker 31, which is pivoted to the intermediate slide and has a slot in its upper end which engages with a fixed pin 32 and a slot on the other end of said lever which embraces a pin 33, carried by the line-packing slide 15. A tube-inserting timing-slide 36 lies close behind the intermediate slide, and it carries a spring-pawl 37, which, when permitted to do so, will engage with ratchet-teeth 34 in the intermediate slide. Normally, however, this pawl is held out of engagement with these ratchet-teeth by a spring-actuated detent 40, having a laterally-extended rear arm 41. A spacer-releasing timing-slide 43 also occupies a position close behind the intermediate slide, and it carries a spring-pawl 44, which, when permitted to do so, will fly into engagement with ratchet-teeth 35 on the intermediate slide. This pawl is normally held out of engagement with said ratchet-teeth by a detent 45. A definite movement of the tube-inserting timing-slide 36 will result in the left-hand tube 7 being pushed forward into the assembling matrix-line. A bracket 46, which is attached rigidly to the rear side of the tube-packing slide 14, furnishes a pivotal support for the lever 47, having in its lower side a fork which receives a vertically-movable horizontal bar 48, secured to the upper end of two vertical arms 49. These arms are pivotally connected with arms 50, attached to a rock-shaft 51. Another arm 52, attached to this rock-shaft, rests upon the rear end of the space-key 53. The lever 47 has an upwardly-extended finger 54, which engages with the under side of the laterally-extended rear end 41 of the spring-actuated detent 40. The depression of the space-key 53, operating through the described intermediate mechanism, lifts the rear end 41 of the detent 40, and thereby releases the spring-pawl 37 to the action of its spring, which pawl flies forward into engagement with teeth 34 on the intermediate slide 30. Thereafter the timing-slide receives from the intermediate slide a step-by-step movement to the left, which movement continues long enough to certainly permit all of the matrices which were released before the space-key was operated to reach the assembling-rail 1. When this slide 36 has moved far enough, a hook 55, secured to it, engages with and withdraws a spring-detent 56, which detent until so withdrawn engaged with the tail 60 of the lever 61, pivoted to the front side of block 62, rigidly fixed to the vertical rock-shaft 63, near the lower end thereof. When this lever 61 is released from the restraining influence of this detent, its opposite end moves down, thereby bringing a beveled projection 64 thereon into the path of a beveled projection 65 on the line-packing slide 15. This slide being in constant movement will almost immediately bring these two beveled surfaces into engagement, with the result that the rock-shaft 63 will be rocked in that direction which will cause an arm 66, secured to its upper end, to push the left-hand tube 7 forward so that it overhangs the assembling-rail. Almost immediately this is done and during the same movement to the right of the line-packing slide 15 a pin 67, also attached to said slide 15, engages with the beveled projection 68 on the lower surface of the lever 61 and lifts it. The opposite end or tail 60 of said lever moves downward and is engaged automatically by the step 57 on the spring-detent 56, the hook 55 having in the meantime been moved away from said detent so that it is permitted to so act. This movement of the rock-shaft 63, which pushes the tube into the line, brings an arm 69, attached to the rock-shaft, into engagement with the pawl 37, thereby withdrawing it from engagement with the intermediate slide and permitting the spring-detent 40 to automatically take its position behind said pawl, so as to prevent it from again moving into engagement with said slide. It should, perhaps, be noted here that the face of the detent 56, with which the lever-arm 60 engages, is curved about the axis of the shaft 63, so that said detent will be operative in all positions of said shaft. As soon as the pawl 37 has been locked in its retracted position by the detent 40 then a bracket-arm 70, attached to the line-packing slide 15, engages with the end of said pawl 37 and pushes the slide 36 back to the initial position from which it was moved by the intermediate slide. In so moving, this slide 36 withdrew the hook 55 from engagement with the detent 56, so that when the pin 67 engages with and lifts the lever 61, said detent 56 may act to hold the lever 61 in its elevated position, in which position its beveled projection 64 is out of the way of the beveled surface 65 on slide 15. The slide 15 in its same movement to the right brings the beveled end of the bracket 71, which it carries, against an arm 72, attached to shaft 63, whereby the shaft 63 is returned to its initial position. This completes the return movement of those parts which are concerned in the insertion of a tube into the assembling line. In the next movement to the right of the slide 15 the packer-arm 16 thereon will move the last inserted tube (and the rest of the line) along the assembling-rail and will cause the foot of said tube to engage beneath the overhanging front edge of the slide 9. As soon as a tube is pushed forward into the line the tube-packing slide 14 is moved by its spring 12, so as to move all of the remaining tubes to the left, bringing the left tube into contact with the right end of the slide 9. In other words, after the insertion of each tube into the line the tube-packing slide is moved a distance equal to the width of said tube. This tube-packing slide is provided with an inclined slot 73. Adjacent to this slot is the vertical slide 74, carrying the pin 75, which projects into this slot 73. The endwise movement of slide 14 causes a proportionate upward movement of this vertical slide 74. This vertical slide has a horizontal groove 76 near its upper end, which receives a pin 77, attached to a stepped lever 78. This stepped lever is pivotally attached to a horizontal bar 79, which is pivotally connected to the lower ends of two swinging arms 80 and 81, which are supported from their upper ends. The arm 81 is attached to a rock-shaft 82, to which is also attached a horizontal arm 83. This arm is connected by an upwardly-extended link 84 with a stepped wedge 85, which is located in operative relationship with the selecting-plate 100. The tube-packing slide 14 is also connected by a link 87 with one arm 88 of a bell-crank lever, the horizontal arm 89 of which is pivotally connected to the upwardly-extended link 90, whose upper end is connected with a movable stepped wedge 91. Because of the described connections of these wedges with the tube-packing slide and with the horizontal bar 79 the stepped wedge 91 will be moved up a definite distance every time a tube is inserted into the line, and after the line has reached a justifiable length the addition of a matrix to the line will result in the upward movement of the stepped wedge 85 a distance proportionate to the width of the matrix so added. These movements are due to the parts described, which operate in the following manner: The detent 18 overhanging the assembling-rail is pushed along in front of the assembling line, and so the position of the detent-slide will always depend upon the length of said line made up of tubes and matrices. The stepped lever 78 is pivoted to the bar 79 and is, as stated, in the path of the finger 21 on the detent-slide, and the finger is adjusted to such position upon the slide that it will come in contact with said lever when the line has reached a justifiable length, by which is meant when the line might be made of the desired length by the insertion therein of as many of the largest-sized spaces as there are tubes in the line. A further movement of the detent-slide due to the addition of matrices to the line will cause the finger 21 to push against the stepped lever 78, and so move the bar 79. If, however, another tube be added to the line, the tube-packing slide will move the width of a tube and the vertical slide 74 will consequently be moved so as to bring the next step on said lever 78 into the path of the finger 21. The detent-slide must now move a distance equal to the width of the tude so added before it can cause any additional movement of the bar 79, because the steps on the lever 78 are as wide as each tube is. The line-packer arm does actually move the line (and consequently the detent-slide) a distance equal to the width of the tube so added, and so brings the finger 21 into contact with the stepped lever 78. When, therefore, another matrix is added, the consequent movement of the detent-slide will cause a movement, as before explained, of the bar 79. This swinging movement of the stepped lever 78 has taken place every time a tube is added to the line, as well before the finger 21 has come in contact with the lever as after, so that if, for example, three tubes have been added to the line before the line reaches a justifiable length the finger 21 will first contact with the lever 78 on the third step thereof. The position of the stepped wedge 91 is therefore dependent upon the number of tubes in the line, and the position of the stepped wedge 85 is dependent upon the length of the line made up of matrices only.

In this machine, as in the machine described in my said prior patent, the position of the selecting-plate determines how many spacers shall be released and also the thickness of such spacers. The position of the selecting-plate is dependent upon the position of the two-stepped wedges 85 and 91, as will be understood by examining figures 20 to 23, inclusive, in the light of the following description. Any suitable escapements may be provided for the several spacer-channels. The escapements shown are substantially like those which form the subject-matter of my pending application, Serial No. 216,046. Each of the escapements includes an operating-lever 101, on which is a depending pin 102. The selecting-plate 100 lies beneath all of these levers and has a plurality of empirically-arranged pins projecting from its upper surface, being in this respect substantially like the selecting-plate fully described in my prior patent, No. 727,267. On Figs. 29 and 29$^a$ a large number of vertical and horizontal lines have been drawn to indicate various divisions and subdivisions thereof and to make it easier to describe the plate and explain its mode of operation. The surface of the selecting-plate is divided between its ends into six unequal sections, the lines of separation between said sections being indicated by the vertical dotted lines X. These sections are severally associated with the magazines 4 and the tubes 6, which are respectively associated with them. These sections between the dotted lines may therefore be conveniently called "magazine-sections." All of the pins 100$^a$ which are to be found in the left-hand magazine-section of the plate are for coöperation with the escapement of the left-hand magazine. The pins in the next escapement-section of the plate are for coöperation with the escapement of the next magazine, and so on. As each magazine is divided into a number of spacer-channels 5, each having its own escapement, so is each magazine-section on the plate similarly divided into equal divisions, (indicated by the heavy vertical lines,) which divisions are severally associated with the different spacer-channels. All of the pins, therefore, in each of said divisions are for coöperation with the escapements of the corresponding magazine-channels 5. These divisions of the plate may therefore be appropriately called "escapement-divisions." It will be remembered that the several spacer-channels in each magazine contain spacers of different thickness. The left-hand escapement-division of the left-hand magazine-section is associated with the left-hand spacer-channel of the left-hand magazine, and this particular channel contains spacers three units thick. The figure "3" placed below said escapement-division, as indicated on Fig. 29, and all of the other figures placed below the escapement-divisions, as indicated on Figs. 29 and 29$^a$, show the number of units of thickness of those spacers which are contained in the corresponding magazine-channels. The plate, as shown in Figs. 29 and 29$^a$, is still further subdivided, as indicated by light vertical lines, which divide each escapement-division into six equal subdivisions, this number corresponding with the number of tubes 6. It will be further noted that the selecting-plate as shown is divided from front to back into fifty-one equal divisions by horizontal lines. Each of these divisions is associated with a unit of shortage of the assembling matrix-line. The pins which project up from the selecting-plate are all placed at intersections of the rows formed by the subdivisions of the escapement-divisions and the rows formed by the division of the plate according to the units of shortage. When the plate is in readiness to begin its movements which determine what spaces it shall release, it is in such position that all of the pins 100$^a$ thereon are in front of the escapement-pins 102 on the escapement-levers 101, and those pins 100$^a$ in the various escapement-divisions are all to the right of the corresponding escapement-pins. When a tube is added to the line, the plate moves to the left, as indicated by the arrow beneath Fig. 29, a distance equal to one of the subdivisions of the escapement-division, and this brings all of the first or left-hand subdivisions into line with the associated escapement-pins. When another tube is added to the line, the plate again moves to the left, thereby bringing the second of all of said escapement-subdivisions into line with the corresponding escapement-pins, and so on. As stated, however, the pins on the plate are all in front of the pins on the escapement-levers; but when the line reaches justifiable length it begins to move rearward, (the direction being indicated by the arrow at the left of Fig. 29,) and each of said movements will be as many units as there are units in the type or matrix added to the assembling line. It will be noticed that pins may be found only in the left-hand subdivisions of the escapement-divisions of the first or left-hand magazine-section. Therefore whatever may be the position of the plate relative to its rearward movement it will when it has moved only one step to the left be in position to release spacers only from channels of the first magazine, the tube of which was inserted contemporaneously with the first movement of the selecting-plate to the left. It will be also seen that there are pins in the second subdivision of the escapement-divisions of the first two magazine-sections, but not of any of the other magazine-sections. The pins in the third magazine-section begin in the third subdivision of the escapement-divisions. The pins in the fourth magazine-section begin in the fourth subdivision of the escapement-divisions, &c. It is therefore evident that each movement of the plate to the left brings pins of an additional magazine-section into the operative plane. The movement of the plate backward brings some of said pins into operative position beneath the escapement-levers. What pins are so brought into operative position will depend upon the position of the plate, due to its rearward movement. The location of the pins is determined by a previous calculation, they being placed so that whenever the plate stops in its two movements specified the pins will be in operative position beneath the pins of those escapement-levers which will release spacers of the proper number and size to justify the line and will release one spacer only from each magazine whose tube is in line. The selecting-plate is movably supported upon the top of a pivoted frame 103 and is provided with arms 104, which pass beneath and engage with the lower surface of the end members of said frame, wherefore the selecting-plate, while permitted to move in the two directions to be mentioned, is held while so moved in the same substantially horizontal plane and in engagement with said frame 103. At the ends of the selecting-plate are two laterally-projecting pins 105, which enter vertical notches 106 in the upper ends of the arms 107, attached to the rock-shaft 108, these arms being placed at such a distance apart that they engage with the ends of the selecting-plate, and thus prevent any movement of said selecting-plate, except in company with said arms. The rock-shaft 108 is capable of rocking in its bearings and of moving endwise therein. At one end of said shaft is a spring 109, (shown in dotted lines in Fig. 20,) which exerts its pressure against said shaft to move it endwise. The endwise movement imparted by the spring 109 is limited by the vertical stepped wedge 91, against the stepped face of which a finger 110 engages. This finger 110 and another finger 112 project from the end of a sleeve 111, which loosely embraces the shaft 108, so that the latter may turn without turning the sleeve; but the sleeve is prevented from moving lengthwise upon the shaft by the head 130 of a screw which is adjustable in a collar 131, secured to the shaft 108. The turning of this sleeve is impossible, because the arm 110 enters a notch in a fixed bracket 132. Each upward movement of this wedge brings another step thereon opposite this arm 110, and so permits the spring to move the shaft a distance equal to the height of said step. These movements of said shaft cause a corresponding movement of the selecting-plate. The shaft is also under the influence of a spring 113, tending to turn it in its bearings, and so move the selecting-plate rearward.

This movement, however, is resisted by the stepped wedge 85. The upward movement of said stepped wedge, which, as before explained, is proportionate to each addition of matrices to the line, permits a proportionate movement of said selecting-plate, due to the action of the spring 113. The pins upon said selecting-plate are so arranged, as explained in said prior patent, that in whatever position it may be after it has moved at all it will present the proper number of pins in operative relationship with the pins of those escapement-levers which are associated with the magazine-channels 5 containing spaces of the proper thickness to justify the line. The upward movement of the plate 100 is produced by a cam 114, attached to the upper end of a vertical shaft 115, which cam engages with a corresponding cam-surface 116 on the under side of the front member of the pivoted frame 103. This shaft is normally non-rotative. Its lower end has a collar 117 secured to its lower end, which is supported in a circular recess in a ratchet-collar 118, secured to the upper end of an alined shaft 119, which latter shaft is constantly rotated, taking its motion from the driving-shaft 160 through two bevel-gears 161 162. The collar 117 carries a pivoted clutch-pawl 120, which extends out over the top surface of the collar 118, in which top surface ratchet-teeth 121 are formed. Normally the downturned toe 122 of this lever 120 rests upon the upper beveled edge of an arm 123 of a bell-crank lever, the other arm 124 of which extends rearward and is connected by the downwardly-extended link 125 with the rear end of the line-key 126. When, therefore, one depresses the line-key, he will through the described mechanism swing this lever-arm 123 forward out from under the toe of the clutch-pawl 120, which pawl is thereupon forced downward by the spring-actuated pin 127 into the path of one of the ratchet-teeth 121. Thereupon, the two shafts 115 and 119 being clutched together, the former shaft is rotated, the results of such rotation being to elevate the selecting-plate frame 103 through the mechanism described, whereby to operate the escapements and release the spacers. This being accomplished, the further rotation of this shaft acts to turn the rock-shaft 108 to its normal position. On the shaft 115 is secured an arm 128. This arm has a cam-shaped end, which as the shaft rotates engages with the side of an arm 129, attached to the shaft 108, whereby said shaft is moved endwise. When it does so move, a spring-pawl 133 flies in front of finger 112 and temporarily prevents the return movement of shaft 108. This arm 128 as it moves still farther engages the lower face of another arm 134, attached to this shaft 108, and turns it backward, thereby bringing one of the arms 107 behind a spring-pawl 135. (Shown in Fig. 20.) This is the position the described parts occupy until the stepped wedges have been moved down to their normal positions. The mechanism by which this is accomplished will be presently explained. It will be sufficient for the present purpose to say that when the wedge 91 is moved down finger 136, rigidly connected therewith, comes in contact with the pawl 133 and pulls it down from engagement with finger 112, thereby releasing the shaft from the restraining influence of said pawl and permitting the spring 109 to move said shaft, so as to bring the finger 110 against the widest part of said stepped wedge 91. The shaft of course moves endwise, and this movement is sufficient to withdraw the arm 107 from the spring-pawl 135, whereupon the spring 113 turns the shaft in its bearing until the selecting-plate engages with the widest part of the wedge 85. The shaft 115 having made one complete revolution is disconnected from the shaft 119 in the following manner, to wit: The operator has of course released the line-key, which returns to its original position, thereby returning the arm 123 to the position shown in Fig. 13. When now the toe of the lever 120 in its rotation comes in contact with the beveled top of the lever-arm 123, the lever-arm 120 is lifted out of the ratchet-teeth, thereby disconnecting the two shafts, and said toe comes into contact with a shoulder 137 on the lever 123, and thus positively stops shaft 115. The clutch-pawl 120 when it has nearly completed its revolution passes beneath the beveled lower surface of the detent 45, which is thereby lifted, with the result of freeing the spring-pawl 44 on the spacer-releasing timing-slide 43. This pawl immediately flies into engagement with the ratchet-teeth 35 on the intermediate slide 30, whereupon the timing-slide 43 begins a step-by-step movement to the left, which movement occupies sufficient time to insure that the released spacers shall reach their position upon the assembling-rail before the timing-slide reaches the end of its path to travel. When said slide 43 reaches the end of its travel, the point of pawl 44 has traveled up the inclined face of a high tooth 58 on the intermediate slide, and this has so moved the other end of the pawl 44 that the detent 45 will fall by gravity to the position wherein it will hold pawl 44 out of the ratchet-teeth 35. Secured to this timing-slide 43 are two fingers 38 and 39, which lie on opposite sides of a pin 140, which is connected with an electric switch 141, having two fork arms which are insulated from the machine-frame and also from the pin 140. The movement of this switch will make and break the electrical connection between two insulated contact-plates 142 and 143. This switch is moved in the direction to cause it to connect said plates by the finger 39 when the slide 43 has been moved to the left by the intermediate slide, as stated, and said switch is moved in the contrary direction by the finger 38 when slide 43 has been returned to its normal position (shown in Fig. 6) by the return movement of the detent-slide. As has been previously stated, that movement of the push-slide 25 which pushes the justified line along the assembling-rail to make room for the assembling and justification of another line is the cause of the return of the detent-slide to its normal position. The push-slide has, however, other functions in connection with the justifying mechanism, wherefore it is in order to describe the means for imparting to the push-slide 25 its advancing and receding movements and also the means whereby such movements affect the justifying mechanism. The push-slide is connected with a sprocket-chain 155, which runs over two sprocket-wheels 154 156, of which the latter is an idler and the former is attached to a vertical shaft 150. On the lower end of this shaft a beveled gear 151 is fixed, and this gear is always in mesh with two beveled gears 163 164, loosely mounted on the driving-shaft 160. Two friction-clutches 165 166 may be operated independently to connect these beveled gears to shaft 160, wherefore shaft 150 may be rotated in either direction to correspondingly move the push-slide. These clutches are respectively operated by two pairs of electromagnets, the two magnets 180 181 being provided for opening and closing clutch 165 and the magnets 182 183 being provided for opening and closing clutch 166. The armatures of the two magnets 180 181 are rigidly connected together, forming what may be called an "armature-frame" 184. The armatures of the magnets 182 183 are similarly connected to form an armature-frame 185. The armature-frame 184 is connected by link 186 with the operating-lever 167 of clutch 165, and a link 187 similarly connects armature-frame 185 with the operating-lever 168 of clutch 166. These magnets are connected in circuits which are normally broken in one or more places; but the several magnet-circuits are closed automatically in proper sequence in the manner and by the means now to be described. The circuits of these magnets are shown diagrammatically in Fig. 28, wherein it will be seen that the sequential closing and opening of said circuits are dependent upon the operation of the switches 141, 188, and 193. The switch 193 is a metal collar on an endwise-movable rod 194, having two arms 195 196, which lie in the path of the push-slide. This switch-collar lies between the two insulated springs 197 198, with which it will alternately contact, depending upon the position of rod 194. These springs are connected in the circuits of the magnets, as shown in said diagram. The switch 188 is for the purpose of connecting or disconnecting two contact-plates 189 190. The switch-lever 192 is insulated and is connected with the armature-frame 185 by a link 191. One pole of the generator 200 is connected with the machine-frame. When, therefore, any one of these four electromagnets is connected electrically with the generator and with some metallic part of the machine-frame, the circuit of that magnet is completed. Fig. 28 shows the switches in their normal position, in which, as will be seen, the circuits of all of the magnets are broken. The switch-collar 193 is, however, in contact with the spring 197.

When in the operation of the justifying mechanism the operator depresses the line-key, the spacers will be released and fall through the tubes into the line. The intermediate slide 30 will move slide 43 slowly until the finger 39 thereon shall engage with and operate the switch-lever 141. The circuit of magnet 180 is thereby closed, and as a result clutch 165 will be closed. Shaft 150 thereupon begins to rotate in the direction which advances the push-slide—that is to say, moves it to the left. On shaft 150 is a pinion 152, frictionally connected with the shaft by a friction-washer 153, so that unless some force is applied to said pinion superior to the friction the pinion will rotate with the shaft 150. A rack-slide 170 engages with this pinion, and it has a notch 171, which receives a downwardly-projecting arm 172, secured to a rock-shaft 173, which rock-shaft has two upwardly-extending arms 174, which engage in notches in the under side of slide 9. A fixed yoke 176 is secured over the end of the rack-slide, and on said slide is a fixed collar 177. When the shaft 150 begins to rotate, as stated, it turns pinion 152, thereby moving the rack-slide forward, with the result that slide 9 is drawn backward. This draws the tubes backward from the line and also draws back the detent 18, so that the justified matrix-line may be moved by the push-slide to the left to make room on the assembling-rail for another line to be assembled and justified. This movement of slide 9 takes place before the push-arm 26 engages with the matrix-line, and said movement of slide 9 is stopped by the engagement of collar 177 with the frame member 10. This shaft 150, however, continues to rotate independently of pinion 152, and the push-slide therefore continues its advancing movement, with certain results, as follows: The detent-slide is returned to its normal position, and in this return movement the detent 18 pushes the tubes back past the right end of slide 9, and these tubes push the tube-packing slide 14 back in opposition to its spring 12. This backward movement of slide 14 draws the wedge 91 downward, thereby tripping pawl 133, which releases shaft 108 to the action of its two operating-springs, and the finger 110, carried by said shaft, engages with the widest part of said wedge 91. This return movement of the line-packer slide also causes the downward movement of the vertical slide 74, and this returns the stepped lever 78 to its normal position. The return of the detent-slide permits bar 79 to move to the right and permits also the stepped wedge 85 to move downward to its normal position, gravity being the only force necessary for such movement. This downward movement of wedge 85 takes place before spring 113 rocks shaft 108, wherefore the movement of the selecting-plate rearward brings it into engagement with the widest part of wedge 85. As the detent-slide also is returned the finger 27 thereon engages with the pin on slide 43 and draws it back to the starting-point, thereby causing the finger 38 thereon to engage with and move the switch 141, thereby breaking the circuit of magnet 180. The left end of the push-slide engages with the arm 195 on rod 194, thereby moving said rod to the left, which carries the switch-collar 193 out of engagement with spring 197 (which also breaks the circuit of magnet 180) and into engagement with the spring 198, which completes the circuits of magnet 181, by which clutch 165 is opened, and of magnet 182, by which clutch 166 is closed. The shaft 150 now begins to rotate in the contrary direction, with the following results: The rack-slide 170 is moved rearward until its end strikes yoke 176, whereby further movement of the slide is stopped. This rearward movement causes the forward movement of slide 9, in which forward movement the tubes are left between the right end of said slide and the finger 13 on the tube-packing slide 14, and the detent 18 is carried forward over the assembling-rail. The push-slide begins its return movement, which continues after the rack-slide 170 is stopped until its right end strikes the arm 196 on rod 194, thereby moving said rod endwise, which carries the switch-collar 193 out of engagement with spring 198 and again into engagement with spring 197. The circuits of the two magnets 181 and 182 are now broken, and the circuit of magnet 183 is closed. The closing of this circuit is due to the action of the switch 188, which switch was moved so as to connect two contact-plates 189 and 190 by that movement of the armature-frame 185 which concurred when the circuit of magnet 182 was completed—that is to say, this movement of the switch 188 closed one break in the circuit of magnet 183, while the contact of the switch-collar 193 with spring 197 closes the other break. The movement of the armature-frame 185 which causes the clutch 166 to open also so moves the switch 188 as to break the circuit of the magnet 183. The shaft 150 being no longer driven, the push-slide comes to rest, and all of the parts which coöperate in the justification of the line have been returned to their initial positions ready to again do the work hereinbefore described for which they are provided.

It will be noticed in the drawings that the front sides of the lower portions of the tube 6 are cut away. This is done in this particular construction to enable the lower ends of said tubes to pass behind the assembling-spout 2. If the front side of these tubes are not closed when the spacers are released, said spacers may fall out of the tubes instead of through them onto the assembling-rail. To prevent this action, a plate 93 is secured to a frame member of the machine so as to close a portion of the front sides of said tubes when the tubes have been moved into the line and to the left with the line. It is particularly necessary that the operator be able to remove from the assembled line any matrices which may have been assembled therein by mistake. To permit this, the matrix must be accessible during the assembling of the line, and in order that they may be accessible the lower part 94 of the plate 93 is hinged to the upper part on a horizontal pivot, forming a swinging gate which normally is swung up so as not to prevent the removal of said matrices from the line. When, however, the line-key has been struck for the purpose, among other things, of releasing the spacers, this gate is swung down to a vertical position, so as to close the open front sides of said tubes. It is so swung down by the action of electromagnet 95, the armature of which is connected by a link 96 with slotted lever 97, which engages with an arm 86, secured to said gate 94. The circuit of this magnet is normally incomplete, but may be completed when one side of the magnet is placed in electrical contact with the machine-frame. This is accomplished at the proper time by means of an insulated spring-brush 98, which bears against the periphery of a metallic disk 99, which is secured to the vertical shaft 115. A strip of insulating material 92 is set into the periphery of this disk, and said spring bears against this insulated material when the shaft 115 is at rest. Almost immediately, however, this shaft begins to rotate for the purpose of causing the upward movement of frame 103, so as to release the spacers, the metal part of this disk comes in contact with this spring-brush, and as a result this gate is lowered and remains lowered, thereby closing the front sides of said tubes until the spacers have reached the assembling-rail. Thereafter, but before shaft 115 completes its revolution, the insulating-surface of said disk moves into contact with said spring, thereby breaking the circuit of the magnet, whereupon a spring 199 again raises the gate.

I claim—

1. In justifying mechanism for use in a machine for assembling matrices in line upon an assembling-rail, the combination with a detent-slide having a pressure-finger and a detent which overhangs said rail in advance of the matrices thereon, a reciprocating line-packer which, after every addition to the line, pushes the line along the assembling-rail a distance equal to such addition and thereby correspondingly moves the detent-slide of an endwise-movable bar, a stepped lever pivoted thereto in the path of the finger on the detent-slide, a plurality of spacer-assembling tubes, mechanism for moving the lower ends of said tubes one by one forward over the assembling-rail, and mechanism which is brought into action by the introduction of a tube into the line for moving said stepped lever, a selecting-plate, and mechanism operated by said endwise-movable bar for controlling the movement of the selecting-plate in one direction.

2. The combination of a plurality of spacer-assembling tubes which are normally bunched behind the assembling-rail and mechanism by which said tubes are moved singly out of the bunch and over the assembling-rail, with a spring-actuated tube-packer slide in contact with the end tube of said bunch, a movable selecting-plate, and mechanism operated by said tube-packing slide for controlling the movement of said selecting-plate in one direction.

3. In justifying mechanism for use in a machine for assembling matrix-lines, the combination of a detent-slide having a detent which projects over the assembling-rail in advance of the matrices thereon and having a finger adjustably secured thereto, a reciprocating line-packer which, after every addition to the line pushes said line along the assembling-rail a distance equal to such addition and thereby correspondingly moving the detent-slide, with an endwise-movable bar, a stepped lever pivoted thereto, a tube-follower slide, mechanism operated by said tube-follower slide for moving said stepped lever to bring different steps thereon into the path of the finger on the detent, a selecting-plate movable in two directions to bring it into operative position and having upon its top surface a plurality of combinations of escapement-operating projections, mechanism operated by said endwise-movable bar for determining the movement of said selecting-plate in one direction, and mechanism operated by the tube-packer slide for determining the movement of said plate in a relatively transverse direction.

4. The combination of a detent-slide having a detent which extends over the assembling-rail and having a finger adjustably secured thereto, an endwise-movable bar, a stepped lever pivoted thereto in the path of said finger, and mechanism set in motion by the introduction of a tube into the line for varying the position of said stepped lever, a movable selecting-plate, and mechanism connected with said bar for controlling the movement of said selecting-plate in one direction.

5. The combination of a selecting-plate movable in two directions in a horizontal plane, springs acting to induce such movements, and stepped wedges restraining such movements, with the tube-packer slide, mechanism intermediate of said slide and one of the wedges, whereby to move the latter, a detent-slide having a detent which extends over the assembling-rail and having also a finger, an endwise-movable bar, mechanism intermediate of said bar and the other wedge whereby to move the latter, a stepped lever pivoted upon said bar in the path of said finger, and mechanism intermediate of the tube-packer slide and said stepped lever whereby to move the latter.

6. The combination of a selecting-plate movable in two directions in a horizontal plane, springs acting to induce such movements, and two stepped wedges restraining such movements, with a tube-packer slide, mechanism intermediate of said slide and one of the wedges, whereby to move the latter, a detent-slide having a detent which extends over the assembling-rail and having a finger, an endwise-movable bar, mechanism intermediate of said bar and the other wedge whereby to move the latter, a stepped lever pivoted upon said bar in the path of said finger, a vertically-movable slide having a horizontal slot which receives a pin secured to said stepped lever, an inclined slot in the tube-packer slide, and a pin entering the same and secured to said vertical slide.

7. In justifying mechanism for use in a machine for assembling matrix or type lines, the combination with a plurality of spacer-holding magazines, each containing a plurality of spacer-holding channels, independent escapements for said several channels, a movable selecting-plate beneath said escapements having on its top surface a plurality of combinations of escapement-operating projections, spacer-assembling tubes whose lower ends may be moved into and out of the matrix-line and whose upper ends are respectively in communication with said several magazines, of a spring tending to move said selecting-plate horizontally in one direction, a movable stepped wedge restraining said movement, a spring-actuated tube-packer slide, and mechanism operated by said slide for moving said stepped wedge.

8. In justifying mechanism for use in a machine for assembling matrix or type lines, the combination with a plurality of spacer-holding magazines, each containing a plurality of spacer-holding channels, independent escapements for said several channels, a movable selecting-plate beneath said escapements having on its top surface a plurality of combinations of escapement-operating projections, spacer-assembling tubes whose lower ends may be moved into and out of the matrix-line, and whose upper ends are respectively in communication with said several magazines, of a spring tending to move said selecting-plate horizontally in one direction, a movable stepped wedge restraining said movement, a spring-actuated tube-packer slide, a bell-crank lever, one arm of which is connected with said tube-packer slide, the other arm being connected with said stepped wedge.

9. In justifying mechanism for use in a machine for assembling matrix or type lines, the combination with a plurality of spacer-holding channels, independent escapements therefor, an upwardly-movable frame beneath said escapements, means for operating said frame, and the selecting-plate 100 movably supported upon said frame and having pins projecting from its ends, of a rock-shaft having two arms which abut the ends of said selecting-plate and have approximately vertical notches which receive said pins, two springs tending respectively to turn said shaft and to move it endwise, two stepped wedges restraining the spring-induced movements of said rock-shaft, means for independently moving said wedges, and means for positively returning the shaft to its initial position.

10. In justifying mechanism for use in a machine for assembling matrix or type lines, the combination with a plurality of spacer-holding channels, independent escapements therefor, an upwardly-movable frame beneath said escapements, means for operating said frame, the selecting-plate 100 movably supported upon said frame and having pins projecting from its ends, of a rock-shaft having two arms which abut the ends of said selecting-plate and have approximately vertical notches which receive said pins, two springs tending respectively to turn said shaft and to move it endwise, two stepped wedges restraining the spring-induced movements of said rock-shaft, and means for independently moving said wedges.

11. In justifying mechanism for use in a machine for assembling matrix or type lines, the combination with a plurality of spacer-holding channels, independent escapements therefor, an upwardly-movable frame beneath said escapements, the selecting-plate 100 movably supported upon said frame and having pins projecting from its ends, of a rock-shaft having two arms which abut the ends of said selecting-plate and have approximately vertical notches which receive said pins, two springs tending respectively to turn said shaft and to move it endwise, two stepped wedges restraining the spring-induced movement of said rock-shaft, means for independently moving said wedges, two operating-arms secured to said rock-shaft, a vertical rotating shaft, means secured to the upper end thereof for moving said frame upward, means secured to said shaft and adapted to engage with the two operating-arms on the rock-shaft to move it in both directions in opposition to said springs, and two spring-detents acting to temporarily restrain said shaft from being moved by its two springs, and means for causing said vertical shaft to make one revolution and no more.

12. In justifying mechanism for use in a machine for assembling matrix or type lines, the combination with the movable selecting-plate having pins projecting from its ends, of a rock-shaft having two arms which abut the ends of said selecting-plate and have approximately vertical notches which receive said pins, two springs tending to turn said shaft and to move it endwise respectively, a sleeve in which said rock-shaft may turn, means preventing relative endwise movement of said sleeve and shaft, a stepped wedge engaging with said sleeve to govern the endwise movement of said shaft, a spring-detent engaging with said sleeve to temporarily prevent the spring-induced endwise movement of said shaft, and a finger carried by said stepped wedge for engaging with said spring-detent to withdraw it.

13. In justifying mechanism for use in a machine for assembling matrix or type lines, the combination with the movable selecting-plate having pins projecting from its ends, a rock-shaft having two upwardly-extended arms which abut the ends of said selecting-plate and have approximately vertical notches which receive said pins, two springs tending to turn said shaft and to move it endwise respectively, two stepped wedges restraining the spring-induced movement of said selecting-plate, means for independently moving said wedges, two operating-arms secured to said rock-shaft, a vertical rotating shaft, means secured to the upper end thereof for moving said selecting-plate upward, a cam-arm secured to said shaft and adapted to engage with the two operating-arms on the rock-shaft to move it in both directions in opposition to said springs, two spring-detents acting to temporarily restrain said shaft from being moved by its two springs, means for periodically causing said rotating shaft to make one revolution and no more.

14. In justifying mechanism for use in a machine for assembling matrix-lines, the combination of a plurality of spacer-holding channels, independent escapements therefor, an upwardly-movable frame beneath said escapements, and a selecting-plate movable upon said frame and having on its top face a plurality of escapement-operating projections, a shaft under the influence of two springs, one tending to move it endwise and the other to turn it, two arms secured to said shaft abutting the ends of said selecting-plate and having notches and pins movable in said notches and projecting from said selecting-plate and two independently-movable step-wedges respectively controlling the two spring-induced movements of said shaft.

15. In justifying mechanism for use in a machine in assembling of type-lines, the combination with the movable selecting-plate having pins projecting from its ends, a rock-shaft having two upwardly-extended arms which abut the ends of said selecting-plate and have approximately vertical notches which receive said pins, two springs tending respectively to turn said shaft and to move it endwise, two stepped wedges restraining the spring-induced movement of said shaft, means for independently moving said wedges, means for turning said rock-shaft and moving it endwise in opposition to its springs, and two spring-detents acting to temporarily restrain said shaft from being moved by its two springs.

16. In justifying mechanism for use in a machine for assembling matrix or type lines, the combination with the movable selecting-plate having pins projecting from its ends, a rock-shaft having two upwardly-extended arms which abut the ends of said selecting-plate and have approximately vertical notches which receive said pins, two springs tending respectively to turn said shaft and to move it endwise, two stepped wedges restraining the spring-induced movement of said shaft, means for independently moving said wedges, means for turning said rock-shaft and moving it endwise in opposition to its springs, a spring-detent acting to temporarily restrain said shaft from being moved endwise by its spring, and a second spring-detent having a beveled end which is adapted to engage with one of the notched arms on said rock-shaft to temporarily prevent the turning of said rock-shaft by its spring, means limiting the spring-induced movement of the latter detent, and means for withdrawing the other detent.

17. In justifying mechanism for use in a machine for assembling matrix-lines, the combination of a plurality of spacer-holding channels, independent escapements therefor, an upwardly-movable frame beneath said escapements, and a selecting-plate movable upon said frame and having on its top face a plurality of escapement-operating projections, a shaft under the influence of two springs, one tending to move it endwise, and the other to turn it, two arms secured to said shaft abutting the ends of said selecting-plate and having notches, and pins movable in said notches and projecting from said selecting-plate and two independently-movable step-wedges respectively controlling the two spring-induced movements of said shaft, a vertical shaft carrying a cam for engagement with said frame whereby to elevate the same and carrying also a beveled arm, two arms secured to the rock-shaft and adapted to be engaged by the arm on the vertical shaft whereby said vertical shaft is moved in two directions in opposition to said springs, and two spring-detents for temporarily restraining said shaft from being moved by either of said springs.

18. In justifying mechanism, the combination of a plurality of spacer-assembling tubes normally held behind the assembling-rail, a vertical rock-shaft carrying an arm adapted to engage with one of said tubes and move it forward, a space-key, and mechanism which is rendered effectual by the depression of the space-key to turn said rock-shaft first in one direction and then the other, whereby a tube is moved forward into the line and the rock-shaft is returned to its normal position, substantially as described.

19. In justifying mechanism, the combination of a plurality of spacer-assembling tubes normally held behind the assembling-rail, a vertical rock-shaft carrying an arm adapted to engage with one of said tubes and move it forward, a reciprocating slide having beveled surfaces, arms carried by said rock-shaft and adapted to be engaged by said beveled surfaces whereby the rock-shaft is rocked first in one direction and then back again to its normal position, means normally withholding one of said arms from its operative position, and a space-key for operating said restraining means, substantially as described.

20. In justifying mechanism, the combination of a plurality of spacer-assembling tubes normally held behind the assembling-rail, a vertical rock-shaft carrying an arm adapted to engage with one of said tubes and move it forward, a space-key, a second arm fixed to said rock-shaft, an operating-arm pivoted to said rock-shaft on a substantially horizontal pivot and carrying a beveled surface, a detent normally holding said operating-arm in an inoperative position, mechanism set in motion by the operation of a space-key for withdrawing said detent whereby said arm is permitted to move into operative position, and a reciprocating slide having beveled surfaces, substantially as described.

21. In justifying mechanism, the combination of a plurality of spacer-assembling tubes normally held behind the assembling-rail, a vertical rock-shaft carrying three arms, to wit, an arm adapted to engage with one of said tubes and move it forward, an arm by means of which the shaft is returned to its normal position, and an operating-arm pivoted to said rock-shaft on a substantially horizontal pivot, said arm having a beveled surface on its side, and another beveled surface on its lower edge, a detent normally holding said arm in an inoperative position, a space-key, mechanism set in operation by the space-key for withdrawing said detent, said reciprocating slide carrying the beveled surface for engaging with the side of said pivoted operating-arm, and a pin for engagement with the beveled surface on the lower edge thereof, and also carrying another beveled surface for operating the shaft-returning arm.

22. In justifying mechanism, the combination of a plurality of spacer-assembling tubes normally held behind the assembling-rail, a vertical rock-shaft carrying three arms, to wit, an arm adapted to engage with one of said tubes and move it forward, an operating-arm pivoted to said rock-shaft on a substantially horizontal pivot, and having one beveled surface on its side and another beveled surface on its lower edge, and a shaft-returning arm, a detent normally holding said pivoted arm in an inoperative position, a constantly-reciprocating intermediate slide having ratchet-teeth, a timing-slide carrying a spring-pawl adapted to engage with said ratchet-teeth and also carrying a hook adapted to withdraw said detent, a detent holding said spring-pawl out of engagement with said ratchet-teeth, a space-key, mechanism operated by the space-key for withdrawing the last-mentioned detent, a reciprocating slide having inclined surfaces for engaging with the pivoted arm and the shaft-returning arm, and a fourth arm secured to said vertical rock-shaft for withdrawing said pawl from its engagement with said rack-teeth.

23. In justifying mechanism, the combination of a plurality of spacer-assembling tubes normally held behind the assembling-rail, a vertical rock-shaft carrying three arms, to wit, an arm adapted to engage with one of said tubes and move it forward, an operating-arm pivoted to said rock-shaft on a substantially horizontal pivot, and having one beveled surface on its side and another beveled surface on its lower edge, and a shaft-returning arm, a detent normally holding said pivoted arm in an inoperative position, a constantly-reciprocating intermediate slide having ratchet-teeth, a timing-slide carrying a spring-pawl adapted to engage with said ratchet-teeth and also carrying a hook adapted to withdraw said detent, a detent holding said spring-pawl out of engagement with said ratchet-teeth, a space-key, and mechanism operated by the space-key for withdrawing the last-mentioned detent, and a reciprocating slide having inclined surfaces for engaging with the pivoted arm and the shaft-returning arm.

24. In justifying mechanism, the combination of a plurality of spacer-assembling tubes normally held behind the assembling-rail, a vertical rock-shaft carrying an arm adapted to engage with one of said tubes and move it forward, a space-key, a reciprocating slide having beveled surfaces, an operating-arm pivoted to said rock-shaft on a substantially horizontal pivot, said arm having a beveled surface on its side and another beveled surface on its lower edge, a detent normally holding said arm in an inoperative position, a constantly-reciprocating intermediate slide having ratchet-teeth and receiving motion from the reciprocating slide first mentioned, a timing-slide carrying a spring-pawl adapted to engage with said ratchet-teeth, and also carrying a hook adapted to withdraw said detent, a detent holding said spring-pawl out of engagement with said rack-teeth, mechanism operated by the space-key for withdrawing the last-mentioned detent, and an arm secured to said vertical rock-shaft for withdrawing said pawl from its engagement with said rack-teeth, and an arm secured to the first-mentioned slide and adapted to return said timing-slide to its normal position.

25. The combination of a reciprocating line-packer slide, an intermediate slide having ratchet-teeth and receiving motion from the line-packer slide, a timing-slide carrying a spring-pawl, a detent holding the spring-pawl out of action, a space-key, and intermediate mechanism for withdrawing said detent, mechanism for inserting a tube into the assembling-line, and mechanism set in operation by said timing-slide for operating said tube-inserting mechanism.

26. In justifying mechanism for use in a machine for assembling matrix-lines, the combination of a plurality of spacer-assembling tubes normally bunched together outside of the assembling-line, a vertical shaft having an arm adapted to push said tubes singly into the assembling-line one by one, a reciprocating line-packer slide, a space-key, and mechanism which is brought into action by the operation of said space-key whereby the line-packer slide will rock said shaft forward and backward.

27. In justifying mechanism for use in a machine for assembling matrices or type-lines, the combination with a plurality of spacer-holding channels independent escapements therefor, a movable selecting-plate beneath said escapements having on its top surface a plurality of combinations of escapement-operating projections and spacer-assembling tubes capable of having their lower ends move into and out of the matrix-line and having their upper end adapted to receive the spacers released from said channels, of a vertical rock-shaft having an arm adapted to push said tubes singly into the assembling-line, a reciprocating line-packer slide, an arm of which projects over the assembling-rail, an operating-arm pivoted to said vertical shaft and having beveled surfaces for engagement with said line-packer slide, a spring-actuated detent engaging with said lever holding it in an inoperative position, a space-key and mechanism set in operation thereby for withdrawing the said detent whereby said lever falls into a position to be operated by a beveled surface on the line-packer slide, a pin carried by the line-packer slide for engaging with said arm to move it back into engagement with said detent, another arm carried by said vertical shaft and adapted to be engaged by a cam-surface on the line-packer slide.

28. In a justifying-machine, spacer-releasing mechanism which includes the combination of a reciprocating slide having ratchet-teeth, a timing-slide carrying a spring-pawl, a detent normally holding said spring-pawl out of engagement with said teeth, mechanism for releasing the spacers, a device operated thereby for actuating said detent, a push-slide, normally disconnected actuating mechanism therefor, and mechanism operated by said timing-slide for operatively connecting the push-slide with its operating mechanism.

29. Spacer-releasing mechanism which includes the combination of a reciprocating slide having ratchet-teeth, a timing-slide carrying a spring-pawl, a detent normally holding said spring-pawl out of engagement with said teeth, a rotating shaft for causing the release of the spacers, an arm carried by said shaft for engagement with said detent, a push-slide, a shaft for operating the same, a clutch connecting said push-slide shaft with a constantly-rotating shaft, an electromagnet for operating said clutch, a switch for closing the circuit of said magnet, and a finger carried by said timing-slide for operating said switch.

30. Spacer-releasing mechanism, which includes the combination of a reciprocating slide having ratchet-teeth, a timing-slide carrying a spring-pawl, a detent normally holding said spring-pawl out of engagement with said teeth, a rotating shaft for causing the release of the spacers, an arm carried by said shaft for engagement with said detent, a push-slide, a shaft for operating the same, a clutch connecting said push-slide shaft with a constantly-rotating shaft, an electromagnet for operating said clutch, a switch for closing the circuit of said magnet, and two fingers carried by said timing-slide for moving said switch first in one direction and then in the other.

31. Spacer-releasing mechanism which includes the combination of a reciprocating shaft having ratchet-teeth, a timing-slide carrying a spring-pawl, a detent normally holding said spring-pawl out of engagement with said teeth, a rotating shaft for causing the release of the spacers, an arm carried by said shaft for engagement with said detent, a push-slide, a shaft for operating the same, a clutch connecting said push-slide shaft with a constantly-rotating shaft, an electromagnet for operating said clutch, a switch for closing the circuit of said magnet, and two fingers carried by said timing-slide for moving said switch first in one direction and then in the other, and mechanism operated by said push-slide whereby the latter timing-slide is returned to its normal position.

32. The combination of a reciprocating slide having ratchet-teeth, a timing-slide carrying a spring-pawl, a detent normally holding said spring-pawl out of engagement with said teeth, mechanism for causing the release of the spacers, a device operated thereby for releasing said detent, a push-slide, a shaft for operating the same, two clutches for connecting said shaft with two oppositely-rotating devices, two electromagnets associated with each clutch for opening and closing the same, and three electrical switches operated respectively by the timing-slide, by the push-slide, and by one of the magnets for opening and closing the circuits of said magnets in proper sequence.

33. The combination of a reciprocating slide having ratchet-teeth, a timing-slide having a spring-pawl to engage with said ratchet-teeth, an automatically-acting detent for engagement with said pawl to hold it out of action, mechanism for withdrawing said detent, and means whereby when said timing-slide has completed its movement said pawl is withdrawn above the plane of said ratchet-teeth, and mechanism for returning said timing-slide to its normal position.

34. The combination of a reciprocating slide having ratchet-teeth of which the tooth at one end is higher than the other teeth, a timing-slide having a spring-pawl to engage with said ratchet-teeth, a detent which automatically moves into position to engage with said pawl and hold it out of action, mechanism for withdrawing said detent, and mechanism for returning said timing-slide to its normal position.

35. A reciprocating slide carrying ratchet-teeth, a timing-slide adjacent thereto carrying a spring-pawl, a detent restraining the said spring-pawl from action, a space-key and means operated by the space-key for withdrawing said detent, a hook carried by the timing-slide for withdrawing the other detent referred to.

36. A reciprocating slide carrying ratchet-teeth, a timing-slide adjacent thereto carrying a spring-pawl, a detent restraining the said spring-pawl from action, a space-key, and means operated by the space-key for withdrawing said detent, a hook carried by the timing-slide for withdrawing the other detent referred to, an arm carried by the tube-packer slide for returning the said timing-slide to its initial position.

37. The combination of a plurality of spacer-tubes having rearwardly-extended feet, a slide whose edge overhangs said feet and has a tongue-and-groove connection therewith, a push-slide, a shaft for operating the same, a gear-wheel frictionally fastened to said shaft, a sliding rack-bar engaging said gear-wheel, and mechanism operated by said rack-bar for moving the said slide backward and forward.

38. The combination of a plurality of spacer-tubes having rearwardly-extended feet, a slide whose edge overhangs said feet and has a tongue-and-groove connection therewith, a push-slide, a shaft for operating the same, a gear-wheel frictionally fastened to said shaft, a sliding rack-bar engaging said gear-wheel, a rock-shaft having two arms which engage with said slide and another arm which engages with said rack-bar.

39. The combination of a plurality of spacer-tubes having rearwardly-extended feet, a slide whose edge overhangs said feet and has a tongue-and-groove connection therewith, a push-slide, a shaft for operating the same, a gear-wheel frictionally fastened to said shaft, a sliding rack-bar engaging said gear-wheel and means for limiting the movement of said rack-bar in both directions, and mechanism transmitting motion from said rack-bar to said slide.

40. The combination of a plurality of spacer-assembling tubes having rearwardly-projecting feet, a slide 9 having its front portion overhanging said feet and connected therewith by longitudinal tongues and grooves, mechanism for moving said slide forward and backward, a detent-slide having an upwardly-extending finger, a detent having in its under side a slot for engagement with said finger and having a rearwardly-projecting foot which extends beneath and has a tongue-and-groove connection with said slide, and mechanisms which move the slide backward, then move the detent-slide to its starting-point, and then move said slide 9 forward.

41. The combination of a plurality of spacer-assembling tubes having rearwardly-projecting feet, a slide 9 having its front portion overhanging said feet and connected therewith by longitudinal tongues and grooves, mechanism for moving said slide forward and backward, a detent-slide having an upwardly-extending finger, a detent having in its under side a slot for engagement with said finger and having a rearwardly-projecting foot which extends beneath and has a tongue-and-groove connection with said slide, and mechanisms which move the slide backward then move the detent-slide to its starting-point, and then move said slide 9 forward, and a tube-packer slide against which said detent pushes said tubes thereby returning it to its starting-point, and a spring opposing said return movement of said tube-packer slide.

42. The combination with a plurality of spacer-holding magazines, a plurality of spacer-assembling tubes movably connected therewith and temporary spacing members connected with the lower ends of said tubes by ball-and-socket connections which are respectively secured to the rear sides of said tubes and temporary spacing members.

43. The combination with the detent-slide, the detent-return slide, both of which have rack-teeth in their edges, and an intermediate pinion engaging with both, and the push-slide adapted when moved in one direction to engage with and move the detent-return slide.

44. The combination of the push-slide and mechanism for moving it, the detent-slide, a detent-return slide having a finger which projects into the path of said push-slide, and mechanism intermediate of the detent-return slide and the detent-slide for moving the latter.

45. The combination of the push-slide and mechanism for moving it, the detent-slide, a detent-return slide having a finger which projects into the path of said push-slide, and mechanism intermediate of the detent-return slide and the detent-slide for moving the latter, the tubes adapted to be moved by said movement of the detent-slide, and the tube-packer slide adapted to be moved back to its starting-point by said tubes.

46. The combination of the push-slide, the detent-slide, and the detent-return slide, all movable in parallel paths crosswise of the machine, a tube-withdrawing slide movable in a horizontal plane forward and backward, mechanisms whereby the latter slide is first moved backward to withdraw the tubes from the line, and the push-slide is then moved to withdraw the justified line, mechanism whereby in so moving said push-slide moves the detent-return slide, mechanism intermediate of this latter slide and the detent-slide whereby motion is transmitted to the latter to return it to its starting-point, a detent carried by said slide for returning the tubes to their normal positions, and mechanism whereby the tube-withdrawing slide is moved forward after the other slides have moved as stated.

47. The combination of the push-slide, the detent-slide, and the detent-return slide, all movable in parallel paths crosswise of the machine, a tube-withdrawing slide movable in a horizontal plane forward and backward, mechanism whereby the latter slide is first moved backward to withdraw the tubes from the line, then the push-slide is moved to withdraw the justified line, and mechanism whereby in so moving the push-slide it moves the detent-return slide, mechanism intermediate of this latter slide and the detent-slide whereby motion is transmitted to the latter to return it to its starting-point, a detent carried by said slide for returning the tubes to their normal position, and mechanism whereby the tube-withdrawing slide is moved forward after the other slides have moved as stated, a timing-slide which is returned to its normal position by the detent-slide, a constantly-reciprocating intermediate slide, mechanism by which to connect it to the timing-slide whereby the latter is moved away from its normal position, and mechanism which is moved by said timing-slide to set in motion that mechanism which moves the push-slide.

48. The combination of the detent-slide having an upwardly-projecting finger, a detent having in its lower face a rearwardly-extended groove into which said finger projects, and having also a rearwardly-projecting foot, and a slide movable backward and forward which has its front edge overhanging the foot of said detent, the said slide and foot having engaging tongues and grooves which extend crosswise of the machine.

49. In justifying mechanism which includes a plurality of spacer-assembling tubes capable of being moved singly over the assembling-rail, the combination of the tube-packer slide, a lever-arm 47 pivoted thereto, a space-key, a vertically-movable horizontal bar operated by said space-key and engaging with said lever-arm, and mechanism operated by said lever-arm whose movement results in the moving of a tube over the assembling-rail.

50. A vertically-movable horizontal bar, a space-key for so moving it, a tube-packing slide, a lever pivoted to said slide resting upon said bar, means for pushing said tubes singly into the assembling line, and mechanism operated by said lever for causing the operation of said tube-moving mechanism.

51. In a machine containing a plurality of spacer-holding channels each having an independent escapement, and a selecting-plate carrying a plurality of escapement-operating projections, of a rotatable shaft, and mechanism operated thereby for moving said selecting-plate in the direction to operate said escapements, a constantly-rotating shaft in alinement with the shaft first named and carrying a ratchet-toothed disk on its upper end, a clutch-lever pivoted to the first-named shaft and adapted to engage with said ratchet-toothed disk, a device normally holding said clutch-lever above said ratchet-teeth, and a line-key for operating the same.

52. The combination of a reciprocating slide having ratchet-teeth, a timing-slide, a spring-pawl carried thereby for engagement with said timing-slide, a detent normally holding said spring-pawl out of action, a line-key, and mechanism set in operation by said line-key for withdrawing said detent.

53. In justifying mechanism for use in machines for assembling type or matrix lines, the combination of a plurality of spacer-magazines, spacer-assembling tubes movably connected at their upper ends with said magazines and being freely movable at their lower ends, and supplementary tubes loosely connected with the lower end of said assembling-tubes, the front sides of said supplementary tubes and of the lower parts of the assembling-tubes being open, with a swinging gate movable into and out of position where it closes the front open sides of said tubes, and mechanism for moving said gate.

54. In justifying mechanism for use in machines for assembling type or matrix lines, the combination of a plurality of spacer-magazines, spacer-assembling tubes movably connected at their upper ends with said magazines and being freely movable at their lower ends, and supplementary tubes loosely connected with the lower ends of said assembling-tubes, the front sides of said supplementary tubes and of the lower parts of the assembling-tubes being open, with a swinging gate movable into and out of position where it closes the front open sides of said tubes, an electromagnet for closing said gate, a spring for opening it, mechanism for releasing spacers, and an electric switch operated by said mechanism for completing the circuit of said electromagnet.

In testimony whereof I hereunto affix my signature in the presence of two witnesses.

BENJAMIN F. BELLOWS.

Witnesses:
 E. L. THURSTON,
 ALBERT H. BATES.